(12) United States Patent
Duggal et al.

(10) Patent No.: US 12,182,538 B2
(45) Date of Patent: Dec. 31, 2024

(54) SYSTEMS AND METHODS FOR CERTIFYING FEATURES FOR GENERATING A DEVICE APPLICATION

(71) Applicant: Engineer.ai Corp., Salt Lake City, UT (US)

(72) Inventors: Sachin Dev Duggal, Salt Lake City, UT (US); Joseph Rifkin, Salt Lake City, UT (US); Ahmed Eshra, London (GB); Sithara Priyadarshini, London (GB); Rohan Patel, London (GB)

(73) Assignee: Engineer.ai Corp., Salt Lake City, UT (US)

( * ) Notice: Subject to any disclaimer, the term of this patent is extended or adjusted under 35 U.S.C. 154(b) by 2 days.

(21) Appl. No.: 18/182,345

(22) Filed: Mar. 12, 2023

(65) Prior Publication Data

US 2024/0303043 A1    Sep. 12, 2024

(51) Int. Cl.
| | | |
|---|---|---|
| *G06F 9/445* | (2018.01) |
| *G06F 8/10* | (2018.01) |
| *G06F 9/455* | (2018.01) |
| *G06F 9/48* | (2006.01) |
| *G06F 9/54* | (2006.01) |
| *G06F 40/30* | (2020.01) |
| *G10L 15/16* | (2006.01) |

(52) U.S. Cl.
CPC ...................................... *G06F 8/10* (2013.01)

(58) Field of Classification Search
CPC .......... G06F 8/10; G06F 40/35; G06F 3/0481; G06F 40/30; G06F 40/205; G06N 3/084; G06N 5/02; G06N 3/0455; G10L 15/16; G10L 13/08
See application file for complete search history.

(56) References Cited

U.S. PATENT DOCUMENTS

| | | |
|---|---|---|
| 7,512,674 B1 | 3/2009 | Jain et al. |
| 9,606,901 B1 | 3/2017 | Elgarat |
| 10,409,562 B2 | 9/2019 | Leonelli et al. |
| 10,423,445 B2 | 9/2019 | Mishra et al. |

(Continued)

OTHER PUBLICATIONS

Office Action dated Sep. 3, 2024 in U.S. Appl. No. 18/182,344.
Office Action dated Sep. 5, 2024 in U.S. Appl. No. 18/182,346.

*Primary Examiner* — Thuy Dao
(74) *Attorney, Agent, or Firm* — Kumar Maheshwari; Mahesh Law Group PC

(57) ABSTRACT

A method includes providing one or more application developers with a selection of a multitude of features to add to the device application, the selection includes a computer readable specification where each of the multitude of features are implemented by one or more building block components, that include one or more functions, which are automatically certified via a certification process upon submission by a building block developer and each of the one or more building block components are configured to be operated by a run engine that facilitates communication between building block components of the device application. The method includes verifying that the selection of the multitude of features are performed by a selection of the one or more building block components and generating the device application. The device application includes the selection of the one or more building block components.

20 Claims, 9 Drawing Sheets

(56) References Cited

U.S. PATENT DOCUMENTS

| | | | |
|---|---|---|---|
| 11,601,529 | B1 | 3/2023 | VanAntwerp et al. |
| 2012/0254827 | A1 | 10/2012 | Conrad et al. |
| 2016/0162686 | A1 | 6/2016 | Nam et al. |
| 2016/0306613 | A1 | 10/2016 | Busi et al. |
| 2017/0322783 | A1 | 11/2017 | Khoyi et al. |
| 2018/0081640 | A1 | 3/2018 | Collins |
| 2019/0394149 | A1 | 12/2019 | McNeill |
| 2020/0183662 | A1 | 6/2020 | Yin et al. |
| 2020/0193221 | A1 | 6/2020 | Aftab et al. |
| 2020/0293291 | A1 | 9/2020 | Guan |
| 2021/0192106 | A1 | 6/2021 | Bourhani et al. |
| 2022/0004366 | A1 | 1/2022 | Ghosh et al. |
| 2022/0091963 | A1 | 3/2022 | Mahajan et al. |
| 2022/0343903 | A1* | 10/2022 | Mostafazadeh ......... G06F 40/35 |
| 2022/0365774 | A1 | 11/2022 | Biesdorf et al. |
| 2023/0208943 | A1 | 6/2023 | VanAntwerp et al. |

\* cited by examiner

SYSTEMS AND METHODS FOR CERTIFYING FEATURES FOR GENERATING A DEVICE APPLICATION

FIELD OF THE INVENTION

This disclosure relates to software automation, machine learning AI, and project management.

BACKGROUND

Large projects run into various inefficiencies. For example, when multiple individuals work on a project, a system of management is required to ensure that each of those individuals add to the project rather than interfere with work that is done by other individuals. In a software project with multiple developers, care must be taken to ensure that developers comply with the same conventions such as the way functions, modules, classes or the like are constructed. Care must be taken to ensure that the work of one developer doesn't interfere with what others have done.

As a project size gets larger, the difficulties in organizing the project similarly expand with size. In software, developers complete sub-projects at different rates. There are instances where one or more developers on a $1^{st}$ portion of a software project may be forced to wait for one or more developers to complete a $2^{nd}$ portion of the project because functionality of the $1^{st}$ portion is dependent on functionality of the $2^{nd}$ portion. Where different sections or portions of a software project depend on one another, there may be issues with dependencies when various portions of the software are modified. Tracking down and determining how a component is malfunctioning may be challenging when the component is dependent on one or more other components.

For example, code that is committed by a developer may break a functionality of an application. Accordingly, software projects have to employ strict version control to segregate development branches. However, this may be inefficient and merging branches can raise new issues. There is a need in the art for a management system for large software project that improves the above stated issues in large projects.

SUMMARY

Systems, methods, and computer readable storage mediums for certifying building block components, which may be used to create device applications, are disclosed. An exemplary embodiment is a method for generating a device application. The method includes certifying a multitude of building block components, each of the multitude of building block components includes functions that operate independently from other building blocks. The building block component is configured to deliver one or more features of a device application that operates a run engine that facilitates communication between building blocks of the device application. The method further includes providing the multitude of building block components in a library for one or more developers of the device application and generating a computer-readable specification for the device application, the computer-readable specification includes one or more of the multitude of building block components. The multitude of building block components may include a customizable portion and a core portion where the certifying comprises verifying that there are no modifications to the core portion. The verifying may further include determining that the functions are configured to operate independently of functions of the other building block components. The verifying may further include determining data types that the building block component is configured to send or receive where the method further includes modifying the building block component to expand the data types that the building block component is configured to send or receive. The modifying may further include determining that the data types are a subset of a superset of data and expanding the subset to comprise data in the superset of data that are not within the subset. The data type may be media that can be played on a computer device. The data type may be a social media network styling.

Another general aspect is a computer system to generate a software application. The computer system includes a processor coupled to a memory where the processor is configured to execute a software to perform certifying a multitude of building block components. Each of the multitude of building block components includes functions that operate independently from other building block components where the building block component is configured to deliver one or more features of a device application that operates a run engine that facilitates communication between building blocks of the device application. The processor is further configured to provide the multitude of building blocks in a library for one or more developers of the device application and generate a computer-readable specification for the device application, the computer-readable specification includes one or more of the multitude of building blocks. The multitude of building block components may include a customizable portion and a core portion where the certifying includes verifying that there are no modifications to the core portion. The verifying may further include determining that the functions are configured to operate independently of functions of the other building block components. The verifying may further include determining data types that the building block component is configured to send or receive where the processor is further configured to modify the building block component to expand data types that the building block component is configured to send or receive. The modifying may include determining that the data types are a subset of a superset of data where the processor is further configured to expand the subset to comprise data in the superset of data that are not within the subset. The data type may be media that can be played on a computer device. The data type may be a social media network.

An exemplary embodiment is a computer readable storage medium having data stored therein representing software executable by a computer, the software includes instructions that, when executed, cause the computer readable storage medium to perform certifying a multitude of building block components. Each of the multitude of building block components includes functions that operate independently from other building block components where the building block is component is configured to deliver one or more features of a device application that operates a run engine that facilitates communication between building block components of the device application. The multitude of building block components may include a customizable portion and a core portion where the certifying includes verifying that there are no modifications to the core portion. The verifying may further include determining that the functions are configured to operate independently of functions of the other building block components. The verifying may further include determining data types that the building block component is configured to send or receive where the instructions further cause the computer readable storage medium to perform modifying the building block component to expand data types that the building block component is configured to send or receive. The modifying may include determining the data types are a subset of a superset of data where the instructions further cause the computer readable storage medium to perform expanding the subset to comprise data in the superset of data that are not within the subset. The data type may be media that can be played on a computer device.

Another general aspect is a method for providing features for a device application. The method includes providing one or more application developers with a selection of a multitude of features to add to the device application, the selection includes a computer readable specification where each of the multitude of features are implemented by one or more building block components, which include one or more functions, that are automatically certified via a certification process upon submission by a building block developer and each of the one or more building block components are configured to be operated by a run engine that facilitates communication between building block components of the device application. The method includes verifying that the selection of the multitude of features are performed by a selection of the one or more building block components and generating the device application. The device application includes the selection of the one or more building block components. The one or more functions of each building block component may be configured to operate independently of the one or more functions of each other building block component of the one or more building block components. The certification process may include verifying that the one or more functions of each building block component are configured to operate independently of functions of other building block components. The certification process may further include determining one or more data types that each building block component is configured to send or receive and editing the building block component to expand the one or more data types that the building block component is configured to send or receive. The editing may include determining that the one or more data types are a subset of a superset of data and modifying the one or more data types to comprise data in the superset of data that are not within the subset. The at least one of the one or more date types may be media that can be played on a computer device. The at least one of the one or more date types may be a social media network. The method may further include adding the building block component to the selection subsequent to modifying the subset.

An exemplary embodiment is a computer system to provide features for a device application. The computer system includes a processor coupled to a memory, the processor is configured to execute a software to provide one or more application developers with a selection of a multitude of features to add to the device application, the selection includes a computer readable specification. Each of the multitude of features are implemented by one or more building block components, which include one or more functions, that are automatically certified via a certification process upon submission by a building block developer. Each of the one or more building block components are configured to be operated by a run engine that facilitates communication between building block components of the device application. The processor is further configured to verify that the selection of the multitude of features are performed by a selection of the one or more building block components and generate the device application. The device application includes the selection of the one or more building block components. The one or more functions of each building block component may be configured to operate independently of the one or more functions of each other building block component of the one or more building block components. The certification process may include verifying that the one or more functions of each building block component are configured to operate independently of functions of other building block components. The certification process may further include determining one or more data types that each building block component is configured to send or receive and editing the building block component to expand at least one of the one or more data types that the building block component is configured to send or receive. The editing may include determining that the at least one of the one or more the data types are a subset of a superset of data and modifying the one or more data types to include data in the superset of data that are not within the subset. The at least one of the one or more the data types may be a social media network. The at least one of the one or more the data types may be media that can be played on a computer device. The processor may be further configured to add the building block component to the selection subsequent to modifying the subset.

Another general aspect is a computer readable storage medium having data stored therein representing software executable by a computer, the software includes instructions that, when executed, cause the computer readable storage medium to perform providing one or more application developers with a selection of a multitude of features to add to a device application, the selection comprising a computer readable specification. Each of the multitude of features are implemented by one or more building block components, that include one or more functions, which are automatically certified via a certification process upon submission by a building block developer. Each of the one or more building block components are configured to be operated by a run engine that facilitates communication between building block components of the device application. The instructions further cause the computer readable storage medium to perform verifying that the selection of the multitude of features are performed by a selection of the one or more building block components and generating the device application. The device application includes the selection of the one or more building block components. The one or more functions of each building block component may be configured to operate independently of the one or more functions of each other building block component of the one or more building block components. The certification process may include verifying that the one or more functions of each building block component are configured to operate independently of functions of other building block components. The certification process may further include determining one or more data types that each building block component is configured to send or receive and editing the building block component to expand at least one of the one or more data types that the building block component is configured to send or receive.

An exemplary embodiment is a method for certifying a building block component for a device application. The method includes generating a machine readable specification for a device application, the machine readable specification includes a specified building block component for implementing one or more features in the device application and receiving a completed building block component corresponding to the specified building block component. The method further includes determining that the completed building block component performs one or more functions specified in the machine readable specification and verifying that the completed building block component is operable with a library of building block components in a software generation platform. The method further includes adding the building block component to the library of building block components. The receiving, verifying, and adding may be automated processes that are performed by a computer system. The method may further include editing the building block component to expand data types that the building block component is configured to send or receive. The editing may include determining data types that the building block component is configured to send or receive are a subset of a superset of data and modifying the building block component to expand data types that the building block component is configured to send or receive. The verifying may further include determining that the building block component is configured to operate independently of other building block components. The building block component may include a customizable portion and a core portion where the verifying includes determining that there are no modifications to the core portion. The data types may be media that can be played on a computer device. The data types may be a social media network.

Another general aspect is a computer system to certify a building block component. The computer system includes a processor coupled to a memory, the processor is configured to execute a software to generate a machine readable specification for a device application, the machine readable specification includes a specified building block component for implementing one or more features in the device application and receive a completed building block component corresponding to the specified building block component. The processor is further configured to determine that the completed building block component performs one or more functions specified in the machine readable specification and verify that the completed building block component is operable with a library of building block components in a software generation platform. The processor is further configured to add the building block component to the library of building block components. The processor may be further configured to edit the building block component to expand data types that the building block component is configured to send or receive. The editing may include determining data types that the building block component is configured to send or receive are a subset of a superset of data and modifying the building block component to expand data types that the building block component is configured to send or receive. The verifying may include determining that the building block component is configured to operate independently of other building block components. The building block component may include a customizable portion and a core portion where verifying includes determining that there are no modifications to the core portion. The data types may be media that can be played on a computer device.

An exemplary embodiment is a computer readable storage medium having data stored therein representing software executable by a computer. The software includes instructions that, when executed, cause the computer to perform generating a machine readable specification for a device application, the machine readable specification includes a specified building block component for implementing one or more features in the device application and receiving a completed building block component corresponding to the specified building block component. The instructions further cause the computer to perform determining that the completed building block component performs one or more functions specified in the machine readable specification and verifying that the completed building block component is operable with a library of building block components in a software generation platform. The instructions further cause the computer to perform verifying that the completed building block component is operable with a library of building block components in a software generation platform. The instructions may further cause the computer readable storage medium to perform editing the building block component to expand data types that the building block component is configured to send or receive. The editing may include determining data types that the building block component is configured to send or receive are a subset of a superset of data and modifying the building block component to expand data types that the building block component is configured to send or receive. The verifying may further include determining that the building block component is configured to operate independently of other building block components. The building block component may include a customizable portion and a core portion where verifying includes determining that there are no modifications to the core portion. The data types may be media that can be played on a computer device.

DETAILED DESCRIPTION

Figure 1:
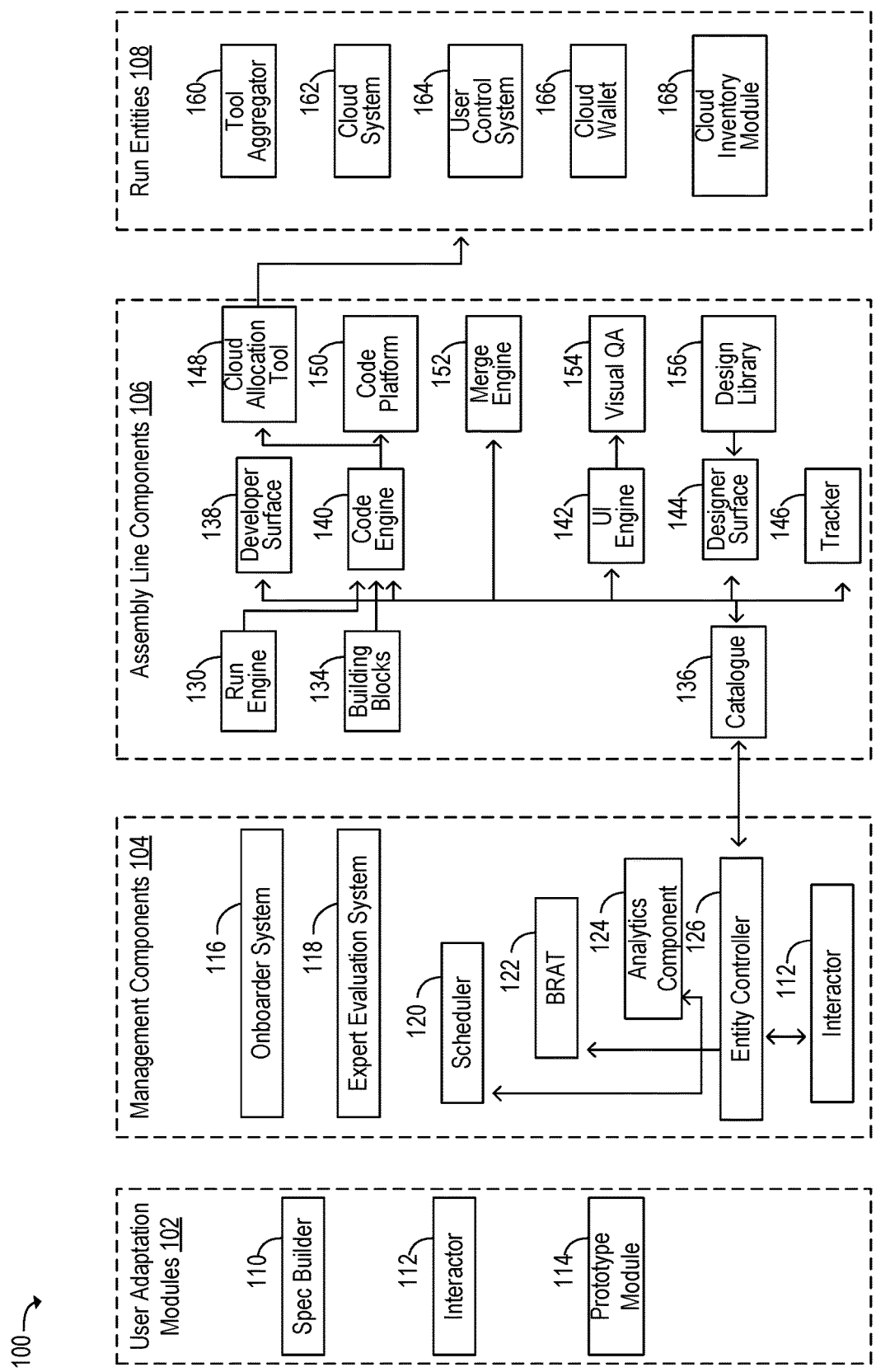
FIG. 1 is a software building system illustrating the components that may be used in an embodiment of the disclosed subject matter.

The disclosed subject matter provides systems and methods for certifying building block components that are used to generate a device application. The device application may be software comprising a multitude of functions, components, modules, media, files, other device applications, or the like. The terms, software application, device application, application, computer application, vehicle application, appliance application, appliance application, IoT application, electronics application, media application, and the like, as used herein, may all refer to an application that is generated by the disclosed subject matter. In an exemplary embodiment, the device application is a software application that is configured to run on a computing system.

The computing system may be any computing device such as a desktop computer, a laptop computer, a handheld device such as a mobile phone, a tablet, a television, game console, a household appliance, any other type of media player, any device that has a user interface, or the like.

In an exemplary embodiment, one or more developers may use modular components, herein referred to as building block components, to develop a software application. The building block components may be configured to function independently of other building block components. For example, one or more functions in each building block may operate without input from other building block components. However, even though building block components are not dependent on one another, they may be configured to communicate with one another. For example, the disclosed system may include one or more adapters that facilitate transmission of messages to and from building block components. For instance, a building block may cause an adapter to transmit a message to a run engine. The run engine, in turn, may transmit the message to any other building block components that are listening for the message. Building block components that are listening for the message may receive it and perform an action responsive to the message.

Each of the building block components may be configured to have a core set of functions that allow them to operate in the disclosed system with the other building block components and the run engine. Accordingly, a developer may trust that any building block comprises a functionality that will allow it to operate the disclosed system. A building block component may be added to a software application without breaking the functionality of other building block components in the software application. Similarly, a building block compnent may be removed or modified without fear of adverse effects on the functionality of other building block components in the software application.

To ensure that each building block component in the device application performs appropriately, the disclosed subject matter is a method and system for certifying each building block component prior to the use of the building block. In an exemplary embodiment, a multitude of building block components may be submitted to a certification server whereby the certification server will do one or more checks on the building block to verify that it meets a standard. For example, the building block component may be checked to ensure that it contains one or more functions that are required for the building block component to operate with the run engine, which facilitates communication between building block components in a software application. The certification may check each building block component to verify that it functions without dependency on other building block components. A building block will still accept data that is transmitted by the run engine via messages that are sent by adapters, but is not dependent on the transmitted data. Instead, each building block is configured to operate without error independently of other building block components.

Further, embodiments of the disclosed subject matter may modify building block components based on data that the building block component may receive via the run engine. For example, a building block component that is configured to receive MP4 video data for a media player via a message in the run engine may be modified by the disclosed system to receive other types of video data. For example, other types of video data may include MOV, WEBM, and AVI. In another example, a certification server may modify a building block component that is configured to transmit text via Facebook to also transmit text via other types of social media such as Instagram, Twitter, TIKTOK, and Discord.

Referring to FIG. 1, FIG. 1 is a schematic of a software building system 100 illustrating the components that may be used in an embodiment of the disclosed subject matter. The software building system 100 is an AI-assisted platform that comprises entities, circuits, modules, and components that enable the use of state-of-the-art algorithms to support producing custom software.

A user may leverage the various components of the software building system 100 to quickly design and complete a software project. The features of the software building system 100 operate AI algorithms where applicable to streamline the process of building software. Designing, building and managing a software project may all be automated by the AI algorithms.

To begin a software project, an intelligent AI conversational assistant may guide users in conception and design of their idea. Components of the software building system 100 may accept plain language specifications from a user and convert them into a computer readable specification that can be implemented by other parts of the software building system 100. Various other entities of the software building system 100 may accept the computer readable specification or computer readable specification to automatically implement it and/or manage the implementation of the computer readable specification.

The embodiment of the software building system 100 shown in FIG. 1 includes user adaptation modules 102, management components 104, assembly line components 106, and run entities 108. The user adaptation modules 102 entities guide a user during all parts of a project from the idea conception to full implementation. user adaptation modules 102 may intelligently link a user to various entities of the software building system 100 based on the specific needs of the user.

The user adaptation modules 102 may include specification builder 110, an interactor 112 system, and the prototype module 114. They may be used to guide a user through a process of building software and managing a software project. Specification builder 110, the interactor 112 system, and the prototype module 114 may be used concurrently and/or link to one another. For instance, specification builder 110 may accept user specifications that are generated in an interactor 112 system. The prototype module 114 may utilize computer generated specifications that are produced in specification builder 110 to create a prototype for various features. Further, the interactor 112 system may aid a user in implementing all features in specification builder 110 and the prototype module 114.

Spec builder 110 converts user supplied specifications into specifications that can be automatically read and implemented by various objects, instances, or entities of the software building system 100. The machine readable specifications may be referred to herein as a buildcard. In an example of use, specification builder 110 may accept a set of features, platforms, etc., as input and generate a machine readable specification for that project. Specification builder 110 may further use one or more machine learning algorithms to determine a cost and/or timeline for a given set of features. In an example of use, specification builder 110 may determine potential conflict points and factors that will significantly affect cost and timeliness of a project based on training data. For example, historical data may show that a combination of various building block components create a data transfer bottleneck. Specification builder 110 may be configured to flag such issues.

The interactor 112 system is an AI powered speech and conversational analysis system. It converses with a user with a goal of aiding the user. In one example, the interactor 112 system may ask the user a question to prompt the user to answer about a relevant topic. For instance, the relevant topic may relate to a structure and/or scale of a software project the user wishes to produce. The interactor 112 system makes use of natural language processing (NLP) to decipher various forms of speech including comprehending words, phrases, and clusters of phases In an exemplary embodiment, the NLP implemented by interactor 112 system is based on a deep learning algorithm. Deep learning is a form of a neural network where nodes are organized into layers. A neural network has a layer of input nodes that accept input data where each of the input nodes are linked to nodes in a next layer. The next layer of nodes after the input layer may be an output layer or a hidden layer. The neural network may have any number of hidden layers that are organized in between the input layer and output layers.

Data propagates through a neural network beginning at a node in the input layer and traversing through synapses to nodes in each of the hidden layers and finally to an output layer. Each synapse passes the data through an activation function such as, but not limited to, a Sigmoid function. Further, each synapse has a weight that is determined by training the neural network. A common method of training a neural network is backpropagation. Backpropagation is an algorithm used in neural networks to train models by adjusting the weights of the network to minimize the difference between predicted and actual outputs. During training, backpropagation works by propagating the error back through the network, layer by layer, and updating the weights in the opposite direction of the gradient of the loss function. By repeating this process over many iterations, the network gradually learns to produce more accurate outputs for a given input.

Various systems and entities of the software building system 100 may be based on a variation of a neural network or similar machine learning algorithm. For instance, input for NLP systems may be the words that are spoken in a sentence. In one example, each word may be assigned to separate input node where the node is selected based on the word order of the sentence. The words may be assigned various numerical values to represent word meaning whereby the numerical values propagate through the layers of the neural network.

The NLP employed by the interactor 112 system may output the meaning of words and phrases that are communicated by the user. The interactor 112 system may then use the NLP output to comprehend conversational phrases and sentences to determine the relevant information related to the user's goals of a software project. Further machine learning algorithms may be employed to determine what kind of project the user wants to build including the goals of the user as well as providing relevant options for the user.

The prototype module 114 can automatically create an interactive prototype for features selected by a user. For instance, a user may select one or more features and view a prototype of the one or more features before developing them. The prototype module 114 may determine feature links to which the user's selection of one or more features would be connected. In various embodiments, a machine learning algorithm may be employed to determine the feature links. The machine learning algorithm may further predict embeddings that may be placed in the user selected features.

An example of the machine learning algorithm may be a gradient boosting model. A gradient boosting model may use successive decision trees to determine feature links. Each decision tree is a machine learning algorithm in itself and includes nodes that are connected via branches that branch based on a condition into two nodes. Input begins at one of the nodes whereby the decision tree propagates the input down a multitude of branches until it reaches an output node. The gradient boosted tree uses multiple decision trees in a series. Each successive tree is trained based on errors of the previous tree and the decision trees are weighted to return best results.

The prototype module 114 may use a secondary machine learning algorithm to select a most likely starting screen for each prototype. Thus, a user may select one or more features and the prototype module 114 may automatically display a prototype of the selected features.

The software building system 100 includes management components 104 that aid the user in managing a complex software building project. The management components 104 allow a user that does not have experience in managing software projects to effectively manage multiple experts in various fields. An embodiment of the management components 104 include the onboarding system 116, an expert evaluation system 118, scheduler 120, BRAT 122, analytics component 124, entity controller 126, and the interactor 112 system.

The onboarding system 116 aggregates experts so they can be utilized to execute specifications that are set up in the software building system 100. In an exemplary embodiment, software development experts may register into the onboarding system 116 which will organize experts according to their skills, experience, and past performance. In one example, the onboarding system 116 provides the following features: partner onboarding, expert onboarding, reviewer assessments, expert availability management, and expert task allocation.

An example of partner onboarding may be pairing a user with one or more partners in a project. The onboarding system 116 may prompt potential partners to complete a profile and may set up contracts between the prospective partners. An example of expert onboarding may be a systematic assessment of prospective experts including receiving a profile from the prospective expert, quizzing the prospective expert on their skill and experience, and facilitating courses for the expert to enroll and complete. An example of reviewer assessments may be for the onboarding system 116 to automatically review completed portions of a project. For instance, the onboarding system 116 may analyze submitted code, validate functionality of submitted code, and assess a status of the code repository. An example of expert availability management in the onboarding system 116 is to manage schedules for expert assignments and oversee expert compensation. An example of expert task allocation is to automatically assign jobs to experts that are onboarded in the onboarding system 116. For instance, the onboarding system 116 may determine a best fit to match onboarded experts with project goals and assign appropriate tasks to the determined experts.

The expert evaluation system 118 continuously evaluates developer experts. In an exemplary embodiment, the expert evaluation system 118 rates experts based on completed tasks and assigns scores to the experts. The scores may provide the experts with valuable critique and provide the onboarding system 116 with metrics with it can use to allocate the experts on future tasks.

Scheduler 120 keeps track of overall progress of a project and provides experts with job start and job completion estimates. In a complex project, some expert developers may be required to wait until parts of a project are completed before their tasks can begin. Thus, effective time allocation can improve expert developer management. Scheduler 120 provides up to date estimates to expert developers for job start and completion windows so they can better manage their own time and position them to complete their job on time with high quality.

The big resource allocation tool (BRAT 122) is capable of generating optimal developer assignments for every available parallel workstream across multiple projects. BRAT 122 system allows expert developers to be efficiently managed to minimize cost and time. In an exemplary embodiment, the BRAT 122 system considers a plethora of information including feature complexity, developer expertise, past developer experience, time zone, and project affinity to make assignments to expert developers. The BRAT 122 system may make use of the expert evaluation system 118 to determine the best experts for various assignments. Further, the expert evaluation system 118 may be leveraged to provide live grading to experts and employ qualitative and quantitative feedback. For instance, experts may be assigned a live score based on the number of jobs completed and the quality of jobs completed.

The analytics component 124 is a dashboard that provides a view of progress in a project. One of many purposes of the analytics component 124 dashboard is to provide a primary form of communication between a user and the project developers. Thus, offline communication, which can be time consuming and stressful, may be reduced. In an exemplary embodiment, the analytics component 124 dashboard may show live progress as a percentage feature along with releases, meetings, account settings, and ticket sections. Through the analytics component 124 dashboard, dependencies may be viewed and resolved by users or developer experts.

The entity controller 126 is a primary hub for entities of the software building system 100. It connects to scheduler 120, the BRAT 122 system, and the analytics component 124 to provide for continuous management of expert developer schedules, expert developer scoring for completed projects, and communication between expert developers and users. Through the entity controller 126, both expert developers and users may assess a project, make adjustments, and immediately communicate any changes to the rest of the development team.

The entity controller 126 may be linked to the interactor 112 system, allowing users to interact with a live project via an intelligent AI conversational system. Further, the Interactor 112 system may provide expert developers with up-to-date management communication such as text, email, ticketing, and even voice communications to inform developers of expected progress and/or review of completed assignments.

The assembly line components 106 comprise underlying components that provide the functionality to the software building system 100. The embodiment of the assembly line components 106 shown in FIG. 1 includes a run engine 130, building block components 134, catalogue 136, developer surface 138, a code engine 140, a UI engine 142, a designer surface 144, tracker 146, a cloud allocation tool 148, a code platform 150, a merge engine 152, visual QA 154, and a design library 156.

The run engine 130 may maintain communication between various building block components within a project as well as outside of the project. In an exemplary embodiment, the run engine 130 may send HTTP/S GET or POST requests from one page to another.

The building block components 134 are reusable code that are used across multiple computer readable specifications. The term buildcards, as used herein, refer to machine readable specifications that are generated by specification builder 110, which may convert user specifications into a computer readable specification that contains the user specifications and a format that can be implemented by an automated process with minimal intervention by expert developers.

The computer readable specifications are constructed with building block components 134, which are reusable code components. The building block components 134 may be pretested code components that are modular and safe to use. In an exemplary embodiment, every building block component 134 consists of two sections—core and custom. Core sections comprise the lines of code which represent the main functionality and reusable components across computer readable specifications. The custom sections comprise the snippets of code that define customizations specific to the computer readable specification. This could include placeholder texts, theme, color, font, error messages, branding information, etc.

Catalogue 136 is a management tool that may be used as a backbone for applications of the software building system 100. In an exemplary embodiment, the catalogue 136 may be linked to the entity controller 126 and provide it with centralized, uniform communication between different services.

Developer surface 138 is a virtual desktop with preinstalled tools for development. Expert developers may connect to developer surface 138 to complete assigned tasks. In an exemplary embodiment, expert developers may connect to developer surface from any device connected to a network that can access the software project. For instance, developer experts may access developer surface 138 from a web browser on any device. Thus, the developer experts may essentially work from anywhere across geographic constraints. In various embodiments, the developer surface uses facial recognition to authenticate the developer expert at all times. In an example of use, all code that is typed by the developer expert is tagged with an authentication that is verified at the time each keystroke is made. Accordingly, if code is copied, the source of the copied code may be quickly determined. The developer surface 138 further provides a secure environment for developer experts to complete their assigned tasks.

The code engine 140 is a portion of a code platform 150 that assembles all the building block components required by the build card based on the features associated with the build card. The code platform 150 uses language-specific translators (LSTs) to generate code that follows a repeatable template. In various embodiments, the LSTs are pretested to be deployable and human understandable. The LSTs are configured to accept markers that identify the customization portion of a project. Changes may be automatically injected into the portions identified by the markers. Thus, a user may implement custom features while retaining product stability and reusability. In an example of use, new or updated features may be rolled out into an existing assembled project by adding the new or updated features to the marked portions of the LSTs.

In an exemplary embodiment, the LSTs are stateless and work in a scalable Kubernetes Job architecture which allows for limitless scaling that provide the needed throughput based on the volume of builds coming in through a queue system. This stateless architecture may also enable support for multiple languages in a plug & play manner.

The cloud allocation tool 148 manages cloud computing that is associated with computer readable specifications. For example, the cloud allocation tool 148 assesses computer readable specifications to predict a cost and resources to complete them. The cloud allocation tool 148 then creates cloud accounts based on the prediction and facilitates payments over the lifecycle of the computer readable specification.

The merge engine 152 is a tool that is responsible for automatically merging the design code with the functional code. The merge engine 152 consolidates styles and assets in one place allowing experts to easily customize and consume the generated code. The merge engine 152 may handle navigations that connect different screens within an application. It may also handle animations and any other interactions within a page.

The UI engine 142 is a design-to-code product that converts designs into browser ready code. In an exemplary embodiment, the UI engine 142 converts designs such as those made in Sketch into React code. The UI engine may be configured to scale generated UI code to various screen sizes without requiring modifications by developers. In an example of use, a design file may be uploaded by a developer expert to designer surface 144 whereby the UI engine automatically converts the design file into a browser ready format.

Visual QA 154 automates the process of comparing design files with actual generated screens and identifies visual differences between the two. Thus, screens generated by the UI engine 142 may be automatically validated by the visual QA 154 system. In various embodiments, a pixel to pixel comparison is performed using computer vision to identify discrepancies on the static page layout of the screen based on location, color contrast and geometrical diagnosis of elements on the screen. Differences may be logged as bugs by scheduler 120 so they can be reviewed by expert developers.

In an exemplary embodiment, visual QA 154 implements an optical character recognition (OCR) engine to detect and diagnose text position and spacing. Additional routines are then used to remove text elements before applying pixel-based diagnostics. At this latter stage, an approach based on similarity indices for computer vision is employed to check element position, detect missing/spurious objects in the UI and identify incorrect colors. Routines for content masking are also implemented to reduce the number of false positives associated with the presence of dynamic content in the UI such as dynamically changing text and/or images.

The visual QA 154 system may be used for computer vision, detecting discrepancies between developed screens, and designs using structural similarity indices. It may also be used for excluding dynamic content based on masking and removing text based on optical character recognition whereby text is removed before running pixel-based diagnostics to reduce the structural complexity of the input images.

The designer surface 144 connects designers to a project network to view all of their assigned tasks as well as create or submit customer designs. In various embodiments, computer readable specifications include prompts to insert designs. Based on the computer readable specification, the designer surface 144 informs designers of designs that are expected of them and provides for easy submission of designs to the computer readable specification. Submitted designs may be immediately available for further customization by expert developers that are connected to a project network.

Similar to building block components 134, the design library 156 contains design components that may be reused across multiple computer readable specifications. The design components in the design library 156 may be configured to be inserted into computer readable specifications, which allows designers and expert developers to easily edit them as a starting point for new designs. The design library 156 may be linked to the designer surface 144, thus allowing designers to quickly browse pretested designs for user and/or editing.

Tracker 146 is a task management tool for tracking and managing granular tasks performed by experts in a project network. In an example of use, common tasks are injected into tracker 146 at the beginning of a project. In various embodiments, the common tasks are determined based on prior projects, completed, and tracked in the software building system 100.

The run entities 108 contain entities that all users, partners, expert developers, and designers use to interact within a centralized project network. In an exemplary embodiment, the run entities 108 include tool aggregator 160, cloud system 162, user control system 164, cloud wallet 166, and a cloud inventory module 168. The tool aggregator 160 entity brings together all third-party tools and services required by users to build, run and scale their software project. For instance, it may aggregate software services from payment gateways and licenses such as Office 365. User accounts may be automatically provisioned for needed services without the hassle of integrating them one at a time. In an exemplary embodiment, users of the run entities 108 may choose from various services on demand to be integrated into their application. The run entities 108 may also automatically handle invoicing of the services for the user.

The cloud system 162 is a cloud platform that is capable of running any of the services in a software project. The cloud system 162 may connect any of the entities of the software building system 100 such as the code platform 150, developer surface 138, designer surface 144, catalogue 136, entity controller 126, specification builder 110, the interactor 112 system, and the prototype module 114 to users, expert developers, and designers via a cloud network. In one example, cloud system 162 may connect developer experts to an IDE and design software for designers allowing them to work on a software project from any device.

The user control system 164 is a system requiring the user to have input over every feature of a final product in a software product. With the user control system 164, automation is configured to allow the user to edit and modify any features that are attached to a software project regardless as to the coding and design by developer experts and designer. For example, building block components 134 are configured to be malleable such that any customizations by expert developers can be undone without breaking the rest of a project. Thus, dependencies are configured so that no one feature locks out or restricts development of other features.

Cloud wallet 166 is a feature that handles transactions between various individuals and/or groups that work on a software project. For instance, payment for work performed by developer experts or designers from a user is facilitated by cloud wallet 166. A user need only set up a single account in cloud wallet 166 whereby cloud wallet handles payments of all transactions.

A cloud allocation tool 148 may automatically predict cloud costs that would be incurred by a computer readable specification. This is achieved by consuming data from multiple cloud providers and converting it to domain specific language, which allows the cloud allocation tool 148 to predict infrastructure blueprints for customers' computer readable specifications in a cloud agnostic manner. It manages the infrastructure for the entire lifecycle of the computer readable specification (from development to after care) which includes creation of cloud accounts, in predicted cloud providers, along with setting up CI/CD to facilitate automated deployments.

The cloud inventory module 168 handles storage of assets on the run entities 108. For instance, building block components 134 and assets of the design library are stored in the cloud inventory entity. Expert developers and designers that are onboarded by onboarding system 116 may have profiles stored in the cloud inventory module 168. Further, the cloud inventory module 168 may store funds that are managed by the cloud wallet 166. The cloud inventory module 168 may store various software packages that are used by users, expert developers, and designers to produce a software product.

Figure 2:
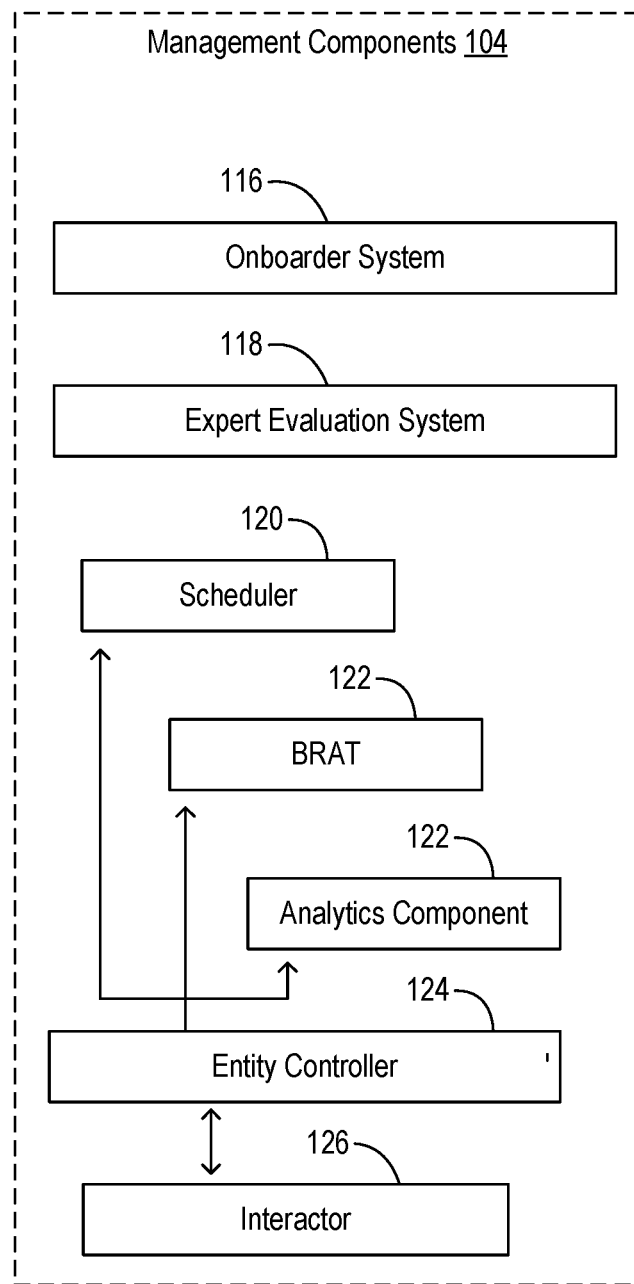
FIG. 2 is a schematic illustrating an embodiment of the management components of the disclosed subject matter.

Referring to FIG. 2, FIG. 2 is a schematic 200 illustrating an embodiment of the management components 104 of the software building system 100. The management components 104 provide for continuous assessment and management of a project through its entities and systems. The central hub of the management components 104 is entity controller 126. In an exemplary embodiment, core functionality of the entity controller 126 system comprises the following: display computer readable specifications configurations, provide statuses of all computer readable specifications, provide toolkits within each computer readable specification, integration of the entity controller 126 with tracker 146 and the onboarding system 116, integration code repository for repository creation, code infrastructure creation, code management, and expert management, customer management, team management, specification and demonstration call booking and management, and meetings management.

In an exemplary embodiment, the computer readable specification configuration status includes customer information, requirements, and selections. The statuses of all computer readable specifications may be displayed on the entity controller 126, which provides a concise perspective of the status of a software project. Toolkits provided in each computer readable specification allow expert developers and designers to chat, email, host meetings, and implement 3rd party integrations with users. Entity controller 126 allows a user to track progress through a variety of features including but not limited to tracker 146, the UI engine 142, and the onboarding system 116. For instance, the entity controller 126 may display the status of computer readable specifications as displayed in tracker 146. Further, the entity controller 126 may display a list of experts available through the onboarding system 116 at a given time as well as ranking experts for various jobs.

The entity controller 126 may also be configured to create code repositories. For example, the entity controller 126 may be configured to automatically create an infrastructure for code and to create a separate code repository for each branch of the infrastructure. Commits to the repository may also be managed by the entity controller 126.

Entity controller 126 may be integrated into scheduler 120 to determine a timeline for jobs to be completed by developer experts and designers. The BRAT 122 system may be leveraged to score and rank experts for jobs in scheduler 120. A user may interact with the various entity controller 126 features through the analytics component 124 dashboard. Alternatively, a user may interact with the entity controller 126 features via the interactive conversation in the interactor 112 system.

Entity controller 126 may facilitate user management such as scheduling meetings with expert developers and designers, documenting new software such as generating an API, and managing dependencies in a software project. Meetings may be scheduled with individual expert developers, designers, and with whole teams or portions of teams.

Machine learning algorithms may be implemented to automate resource allocation in the entity controller 126. In an exemplary embodiment, assignment of resources to groups may be determined by constrained optimization by minimizing total project cost. In various embodiments a health state of a project may be determined via probabilistic Bayesian reasoning whereby a causal impact of different factors on delays using a Bayesian network are estimated.

Figure 3:
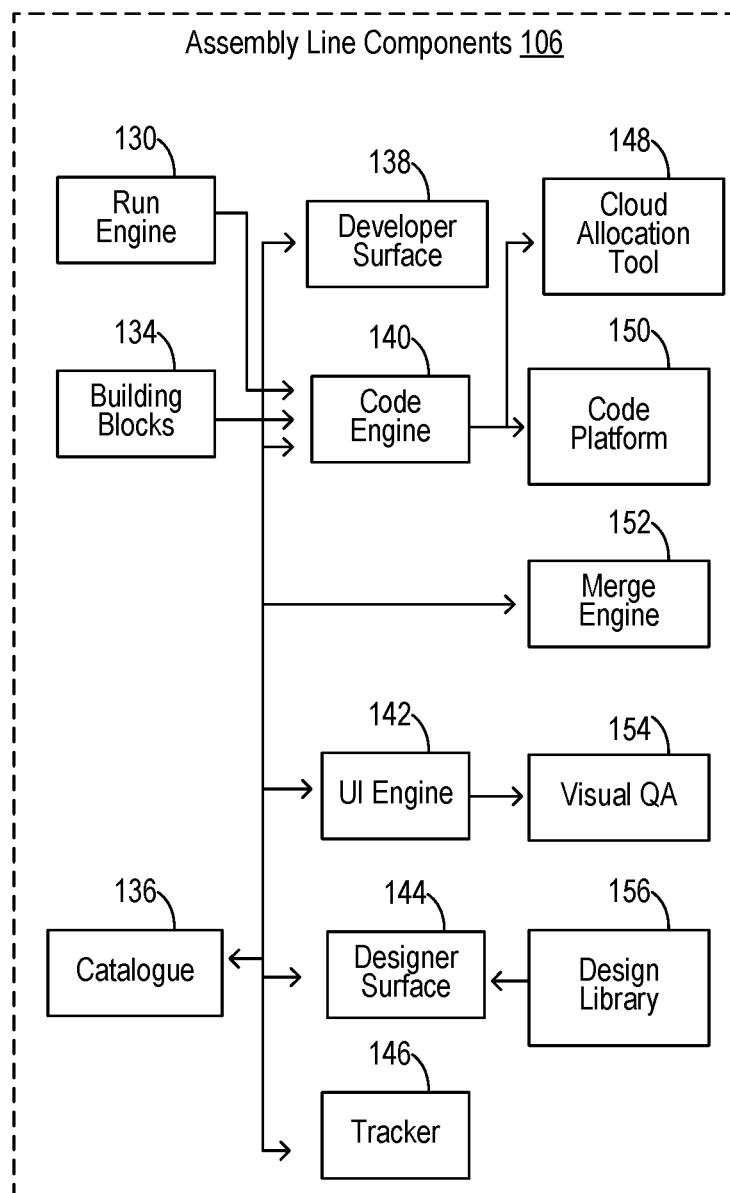
FIG. 3 is a schematic illustrating an embodiment of an assembly line and surfaces of the disclosed subject matter.

Referring to FIG. 3, FIG. 3 is a schematic 300 illustrating an embodiment of the assembly line components 106 of the software building system 100. The assembly line components 106 support the various features of the management components 104. For instance, the code platform 150 is configured to facilitate user management of a software project. The code engine 140 allows users to manage the creation of software by standardizing all code with pretested building block components. The building block components contain LSTs that identify the customizable portions of the building block components 134.

The machine readable specifications may be generated from user specifications. Like the building block components, the computer readable specifications are designed to be managed by a user without software management experience. The computer readable specifications specify project goals that may be implemented automatically. For instance, the computer readable specifications may specify one or more goals that require expert developers. The scheduler 120 may hire the expert developers based on the computer readable specifications or with direction from the user. Similarly, one or more designers may be hired based on specifications in a computer readable specification. Users may actively participate in management or take a passive role.

A cloud allocation tool 148 is used to determine costs for each computer readable specification. In an exemplary embodiment, a machine learning algorithm is used to assess computer readable specifications to estimate costs of development and design that is specified in a computer readable specification. Cost data from past projects may be used to train one or more models to predict costs of a project.

The developer surface 138 system provides an easy to set up platform within which expert developers can work on a software project. For instance, a developer in any geography may connect to a project via the cloud system 162 and immediately access tools to generate code. In one example, the expert developer is provided with a preconfigured IDE as they sign into a project from a web browser.

The designer surface 144 provides a centralized platform for designers to view their assignments and submit designs. Design assignments may be specified in computer readable specifications. Thus, designers may be hired and provided with instructions to complete a design by an automated system that reads a computer readable specification and hires out designers based on the specifications in the computer readable specification. Designers may have access to pretested design components from a design library 156. The design components, like building block components, allow the designers to start a design from a standardized design that is already functional.

The UI engine 142 may automatically convert designs into web ready code such as React code that may be viewed by a web browser. To ensure that the conversion process is accurate, the visual QA 154 system may evaluate screens generated by the UI engine 142 by comparing them with the designs that the screens are based on. In an exemplary embodiment, the visual QA 154 system does a pixel to pixel comparison and logs any discrepancies to be evaluated by an expert developer.

Figure 4:
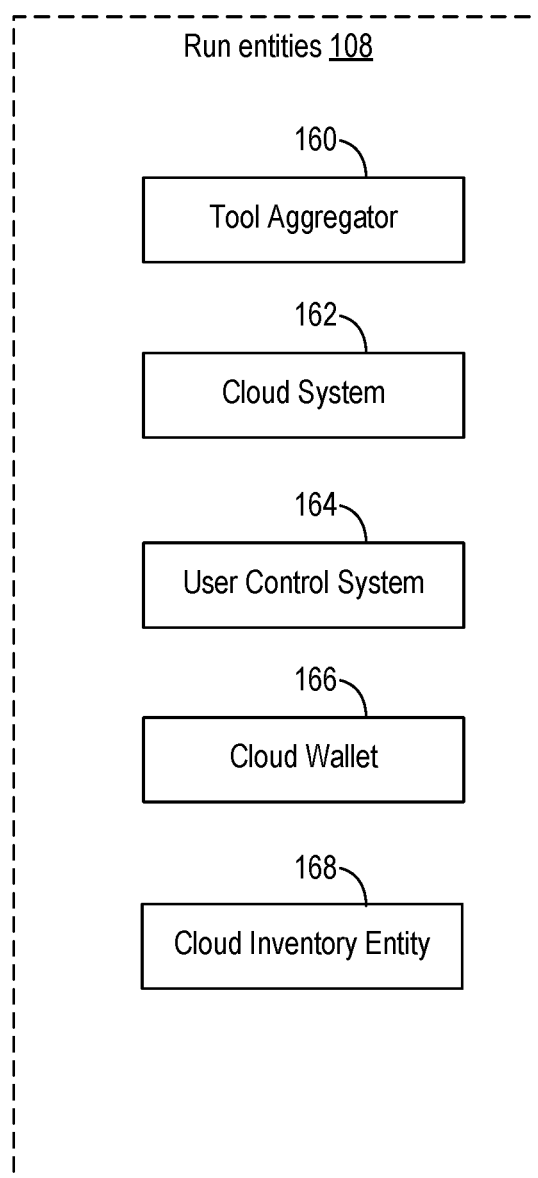
FIG. 4 is a schematic illustrating an embodiment of the run entities of the disclosed subject matter.

Referring to FIG. 4, FIG. 4 is a schematic 400 illustrating an embodiment of the run entities 108 of the software building system. The run entities 108 provides a user with $3^{rd}$ party tools and services, inventory management, and cloud services in a scalable system that can be automated to manage a software project. In an exemplary embodiment, the run entities 108 is a cloud-based system that provides a user with all tools necessary to run a project in a cloud environment.

For instance, the tool aggregator 160 automatically subscribes with appropriate $3^{rd}$ party tools and services and makes them available to a user without a time consuming and potentially confusing set up. The cloud system 162 connects a user to any of the features and services of the software project through a remote terminal. Through the cloud system 162, a user may use the user control system 164 to manage all aspects of a software project including conversing with an intelligent AI in the interactor 112 system, providing user specifications that are converted into computer readable specifications, providing user designs, viewing code, editing code, editing designs, interacting with expert developers and designers, interacting with partners, managing costs, and paying contractors.

A user may handle all costs and payments of a software project through cloud wallet 166. Payments to contractors such as expert developers and designers may be handled through one or more accounts in cloud wallet 166. The automated systems that assess completion of projects such as tracker 146 may automatically determine when jobs are completed and initiate appropriate payment as a result. Thus, accounting through cloud wallet 166 may be at least partially automated. In an exemplary embodiment, payments through cloud wallet 166 are completed by a machine learning AI that assesses job completion and total payment for contractors and/or employees in a software project.

Cloud inventory module 168 automatically manages inventory and purchases without human involvement. For example, cloud inventory module 168 manages storage of data in a repository or data warehouse. In an exemplary embodiment, it uses a modified version of the knapsack algorithm to recommend commitments to data that it stores in the data warehouse. Cloud inventory module 168 further automates and manages cloud reservations such as the tools providing in the tool aggregator 160.

Figure 5:
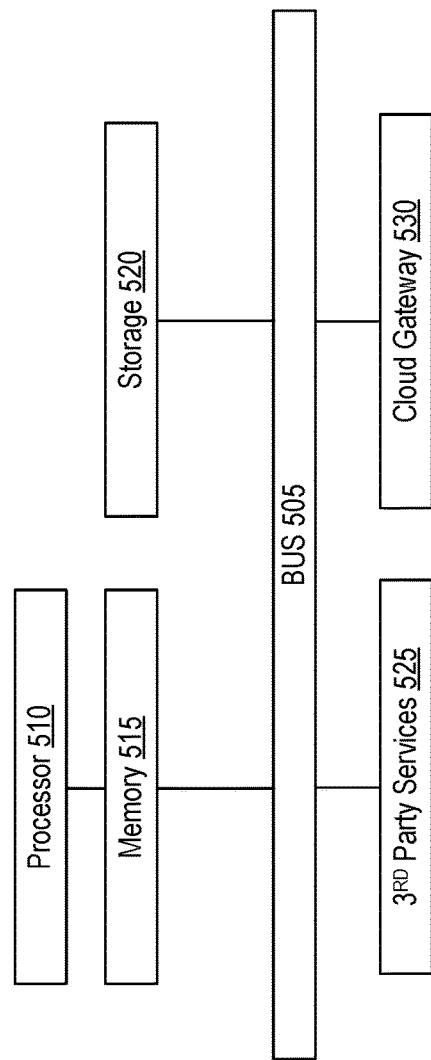
FIG. 5 is a schematic illustrating the computing components that may be used to implement various features of embodiments described in the disclosed subject matter.

Referring to FIG. 5, FIG. 5 is a schematic illustrating a computing system 500 that may be used to implement various features of embodiments described in the disclosed subject matter. The terms components, entities, modules, surface, and platform, when used herein, may refer to one of the many embodiments of a computing system 500. The computing system 500 may be a single computer, a co-located computing system, a cloud-based computing system, or the like. The computing system 500 may be used to carry out the functions of one or more of the features, entities, and/or components of a software project.

The exemplary embodiment of the computing system 500 shown in FIG. 5 includes a bus 505 that connects the various components of the computing system 500, one or more processors 510 connected to a memory 515, and at least one storage 520. The processor 510 is an electronic circuit that executes instructions that are passed to it from the memory 515. Executed instructions are passed back from the processor 510 to the memory 515. The interaction between the processor 510 and memory 515 allow the computing system 500 to perform computations, calculations, and various computing to run software applications.

Examples of the processor 510 include central processing units (CPUs), graphics processing units (GPUs), field programmable gate arrays (FPGAs), complex programmable logic devices (CPLDs), and application specific integrated circuits (ASICs). The memory 515 stores instructions that are to be passed to the processor 510 and receives executed instructions from the processor 510. The memory 515 also passes and receives instructions from all other components of the computing system 500 through the bus 505. For example, a computer monitor may receive images from the memory 515 for display. Examples of memory include random access memory (RAM) and read only memory (ROM). RAM has high speed memory retrieval and does not hold data after power is turned off. ROM is typically slower than RAM and does not lose data when power is turned off.

The storage 520 is intended for long term data storage. Data in the software project such as computer readable specifications, code, designs, and the like may be saved in a storage 520. The storage 520 may be stored at any location including in the cloud. Various types of storage include spinning magnetic drives and solid-state storage drives.

The computing system 500 may connect to other computing systems in the performance of a software project. For instance, the computing system 500 may send and receive data from $3^{rd}$ party services such as Office 365 and Adobe. Similarly, users may access the computing system 500 via a cloud gateway 530. For instance, a user on a separate computing system may connect to the computing system 500 to access data, interact with the run entities 108, and even use $3^{rd}$ party services 525 via the cloud gateway.

Referring to FIG. 1, FIG. 1 is a schematic of a software building system 100 illustrating the components that may be used in an embodiment of the disclosed subject matter. The software building system 100 is an AI-assisted platform that comprises entities, circuits, modules, and components that enable the use of state-of-the-art algorithms to support producing custom software.

A user may leverage the various components of the software building system 100 to quickly design and complete a software project. The features of the software building system 100 operate AI algorithms where applicable to streamline the process of building software. Designing, building and managing a software project may all be automated by the AI algorithms.

To begin a software project, an intelligent AI conversational assistant may guide users in conception and design of their idea. Components of the software building system 100 may accept plain language specifications from a user and convert them into a computer readable specification that can be implemented by other parts of the software building system 100. Various other entities of the software building system 100 may accept the computer readable specification or buildcard to automatically implement it and/or manage the implementation of the computer readable specification.

The embodiment of the software building system 100 shown in FIG. 1 includes user adaptation modules 102, management components 104, assembly line components 106, and run entities 108. The user adaptation modules 102 entities guide a user during all parts of a project from the idea conception to full implementation. user adaptation modules 102 may intelligently link a user to various entities of the software building system 100 based on the specific needs of the user.

The user adaptation modules 102 may include specification builder 110, an interactor 112 system, and the prototype module 114. They may be used to guide a user through a process of building software and managing a software project. Specification builder 110, the interactor 112 system, and the prototype module 114 may be used concurrently and/or link to one another. For instance, specification builder 110 may accept user specifications that are generated in an interactor 112 system. The prototype module 114 may utilize computer generated specifications that are produced in specification builder 110 to create a prototype for various features. Further, the interactor 112 system may aid a user in implementing all features in specification builder 110 and the prototype module 114.

Spec builder 110 converts user supplied specifications into specifications that can be automatically read and implemented by various objects, instances, or entities of the software building system 100. The machine readable specifications may be referred to herein as a buildcard. In an example of use, specification builder 110 may accept a set of features, platforms, etc., as input and generate a machine readable specification for that project. Specification builder 110 may further use one or more machine learning algorithms to determine a cost and/or timeline for a given set of features. In an example of use, specification builder 110 may determine potential conflict points and factors that will significantly affect cost and timeliness of a project based on training data. For example, historical data may show that a combination of various building block components create a data transfer bottleneck. Specification builder 110 may be configured to flag such issues.

The interactor 112 system is an AI powered speech and conversational analysis system. It converses with a user with a goal of aiding the user. In one example, the interactor 112 system may ask the user a question to prompt the user to answer about a relevant topic. For instance, the relevant topic may relate to a structure and/or scale of a software project the user wishes to produce. The interactor 112 system makes use of natural language processing (NLP) to decipher various forms of speech including comprehending words, phrases, and clusters of phases In an exemplary embodiment, the NLP implemented by interactor 112 system is based on a deep learning algorithm. Deep learning is a form of a neural network where nodes are organized into layers. A neural network has a layer of input nodes that accept input data where each of the input nodes are linked to nodes in a next layer. The next layer of nodes after the input layer may be an output layer or a hidden layer. The neural network may have any number of hidden layers that are organized in between the input layer and output layers.

Data propagates through a neural network beginning at a node in the input layer and traversing through synapses to nodes in each of the hidden layers and finally to an output layer. Each synapse passes the data through an activation function such as, but not limited to, a Sigmoid function. Further, each synapse has a weight that is determined by training the neural network. A common method of training a neural network is backpropagation. Backpropagation is an algorithm used in neural networks to train models by adjusting the weights of the network to minimize the difference between predicted and actual outputs. During training, backpropagation works by propagating the error back through the network, layer by layer, and updating the weights in the opposite direction of the gradient of the loss function. By repeating this process over many iterations, the network gradually learns to produce more accurate outputs for a given input.

Various systems and entities of the software building system 100 may be based on a variation of a neural network or similar machine learning algorithm. For instance, input for NLP systems may be the words that are spoken in a sentence. In one example, each word may be assigned to separate input node where the node is selected based on the word order of the sentence. The words may be assigned various numerical values to represent word meaning whereby the numerical values propagate through the layers of the neural network.

The NLP employed by the interactor 112 system may output the meaning of words and phrases that are communicated by the user. The interactor 112 system may then use the NLP output to comprehend conversational phrases and sentences to determine the relevant information related to the user's goals of a software project. Further machine learning algorithms may be employed to determine what kind of project the user wants to build including the goals of the user as well as providing relevant options for the user.

The prototype module 114 can automatically create an interactive prototype for features selected by a user. For instance, a user may select one or more features and view a prototype of the one or more features before developing them. The prototype module 114 may determine feature links to which the user's selection of one or more features would be connected. In various embodiments, a machine learning algorithm may be employed to determine the feature links. The machine learning algorithm may further predict embeddings that may be placed in the user selected features.

An example of the machine learning algorithm may be a gradient boosting model. A gradient boosting model may use successive decision trees to determine feature links. Each decision tree is a machine learning algorithm in itself and includes nodes that are connected via branches that branch based on a condition into two nodes. Input begins at one of the nodes whereby the decision tree propagates the input down a multitude of branches until it reaches an output node. The gradient boosted tree uses multiple decision trees in a series. Each successive tree is trained based on errors of the previous tree and the decision trees are weighted to return best results.

The prototype module 114 may use a secondary machine learning algorithm to select a most likely starting screen for each prototype. Thus, a user may select one or more features and the prototype module 114 may automatically display a prototype of the selected features.

The software building system 100 includes management components 104 that aid the user in managing a complex software building project. The management components 104 allow a user that does not have experience in managing software projects to effectively manage multiple experts in various fields. An embodiment of the management components 104 include the onboarding system 116, an expert evaluation system 118, scheduler 120, BRAT 122, analytics component 124, entity controller 126, and the interactor 112 system.

The onboarding system 116 aggregates experts so they can be utilized to execute specifications that are set up in the software building system 100. In an exemplary embodiment, software development experts may register into the onboarding system 116 which will organize experts according to their skills, experience, and past performance. In one example, the onboarding system 116 provides the following features: partner onboarding, expert onboarding, reviewer assessments, expert availability management, and expert task allocation.

An example of partner onboarding may be pairing a user with one or more partners in a project. The onboarding system 116 may prompt potential partners to complete a profile and may set up contracts between the prospective partners. An example of expert onboarding may be a systematic assessment of prospective experts including receiving a profile from the prospective expert, quizzing the prospective expert on their skill and experience, and facilitating courses for the expert to enroll and complete. An example of reviewer assessments may be for the onboarding system 116 to automatically review completed portions of a project. For instance, the onboarding system 116 may analyze submitted code, validate functionality of submitted code, and assess a status of the code repository. An example of expert availability management in the onboarding system 116 is to manage schedules for expert assignments and oversee expert compensation. An example of expert task allocation is to automatically assign jobs to experts that are onboarded in the onboarding system 116. For instance, the onboarding system 116 may determine a best fit to match onboarded experts with project goals and assign appropriate tasks to the determined experts.

The expert evaluation system 118 continuously evaluates developer experts. In an exemplary embodiment, the expert evaluation system 118 rates experts based on completed tasks and assigns scores to the experts. The scores may provide the experts with valuable critique and provide the onboarding system 116 with metrics with it can use to allocate the experts on future tasks.

Scheduler 120 keeps track of overall progress of a project and provides experts with job start and job completion estimates. In a complex project, some expert developers may be required to wait until parts of a project are completed before their tasks can begin. Thus, effective time allocation can improve expert developer management. Scheduler 120 provides up to date estimates to expert developers for job start and completion windows so they can better manage their own time and position them to complete their job on time with high quality.

The big resource allocation tool (BRAT 122) is capable of generating optimal developer assignments for every available parallel workstream across multiple projects. BRAT 122 system allows expert developers to be efficiently managed to minimize cost and time. In an exemplary embodiment, the BRAT 122 system considers a plethora of information including feature complexity, developer expertise, past developer experience, time zone, and project affinity to make assignments to expert developers. The BRAT 122 system may make use of the expert evaluation system 118 to determine the best experts for various assignments. Further, the expert evaluation system 118 may be leveraged to provide live grading to experts and employ qualitative and quantitative feedback. For instance, experts may be assigned a live score based on the number of jobs completed and the quality of jobs completed.

The analytics component 124 is a dashboard that provides a view of progress in a project. One of many purposes of the analytics component 124 dashboard is to provide a primary form of communication between a user and the project developers. Thus, offline communication, which can be time consuming and stressful, may be reduced. In an exemplary embodiment, the analytics component 124 dashboard may show live progress as a percentage feature along with releases, meetings, account settings, and ticket sections. Through the analytics component 124 dashboard, dependencies may be viewed and resolved by users or developer experts.

The entity controller 126 is a primary hub for entities of the software building system 100. It connects to scheduler 120, the BRAT 122 system, and the analytics component 124 to provide for continuous management of expert developer schedules, expert developer scoring for completed projects, and communication between expert developers and users. Through the entity controller 126, both expert developers and users may assess a project, make adjustments, and immediately communicate any changes to the rest of the development team.

The entity controller 126 may be linked to the interactor 112 system, allowing users to interact with a live project via an intelligent AI conversational system. Further, the Interactor 112 system may provide expert developers with up-to-date management communication such as text, email, ticketing, and even voice communications to inform developers of expected progress and/or review of completed assignments.

The assembly line components 106 comprise underlying components that provide the functionality to the software building system 100. The embodiment of the assembly line components 106 shown in FIG. 1 includes a run engine 130, building block components 134, catalogue 136, developer surface 138, a code engine 140, a UI engine 142, a designer surface 144, tracker 146, a cloud allocation tool 148, a code platform 150, a merge engine 152, visual QA 154, and a design library 156.

The run engine 130 may maintain communication between various building block components within a project as well as outside of the project. In an exemplary embodiment, the run engine 130 may send HTTP/S GET or POST requests from one page to another.

The building block components 134 are reusable code that are used across multiple computer readable specifications. The term buildcards, as used herein, refer to machine readable specifications that are generated by specification builder 110, which may convert user specifications into a computer readable specification that contains the user specifications and a format that can be implemented by an automated process with minimal intervention by expert developers.

The computer readable specifications are constructed with building block components 134, which are reusable code components. The building block components 134 may be pretested code components that are modular and safe to use. In an exemplary embodiment, every building block component 134 consists of two sections—core and custom. Core sections comprise the lines of code which represent the main functionality and reusable components across computer readable specifications. The custom sections comprise the snippets of code that define customizations specific to the computer readable specification. This could include placeholder texts, theme, color, font, error messages, branding information, etc.

Catalogue 136 is a management tool that may be used as a backbone for applications of the software building system 100. In an exemplary embodiment, the catalogue 136 may be linked to the entity controller 126 and provide it with centralized, uniform communication between different services.

Developer surface 138 is a virtual desktop with preinstalled tools for development. Expert developers may connect to developer surface 138 to complete assigned tasks. In an exemplary embodiment, expert developers may connect to developer surface from any device connected to a network that can access the software project. For instance, developer experts may access developer surface 138 from a web browser on any device. Thus, the developer experts may essentially work from anywhere across geographic constraints. In various embodiments, the developer surface uses facial recognition to authenticate the developer expert at all times. In an example of use, all code that is typed by the developer expert is tagged with an authentication that is verified at the time each keystroke is made. Accordingly, if code is copied, the source of the copied code may be quickly determined. The developer surface 138 further provides a secure environment for developer experts to complete their assigned tasks.

The code engine 140 is a portion of a code platform 150 that assembles all the building block components required by the build card based on the features associated with the build card. The code platform 150 uses language-specific translators (LSTs) to generate code that follows a repeatable template. In various embodiments, the LSTs are pretested to be deployable and human understandable. The LSTs are configured to accept markers that identify the customization portion of a project. Changes may be automatically injected into the portions identified by the markers. Thus, a user may implement custom features while retaining product stability and reusability. In an example of use, new or updated features may be rolled out into an existing assembled project by adding the new or updated features to the marked portions of the LSTs.

In an exemplary embodiment, the LSTs are stateless and work in a scalable Kubernetes Job architecture which allows for limitless scaling that provide the needed throughput based on the volume of builds coming in through a queue system. This stateless architecture may also enable support for multiple languages in a plug & play manner.

The cloud allocation tool 148 manages cloud computing that is associated with computer readable specifications. For example, the cloud allocation tool 148 assesses computer readable specifications to predict a cost and resources to complete them. The cloud allocation tool 148 then creates cloud accounts based on the prediction and facilitates payments over the lifecycle of the computer readable specification.

The merge engine 152 is a tool that is responsible for automatically merging the design code with the functional code. The merge engine 152 consolidates styles and assets in one place allowing experts to easily customize and consume the generated code. The merge engine 152 may handle navigations that connect different screens within an application. It may also handle animations and any other interactions within a page.

The UI engine 142 is a design-to-code product that converts designs into browser ready code. In an exemplary embodiment, the UI engine 142 converts designs such as those made in Sketch into React code. The UI engine may be configured to scale generated UI code to various screen sizes without requiring modifications by developers. In an example of use, a design file may be uploaded by a developer expert to designer surface 144 whereby the UI engine automatically converts the design file into a browser ready format.

Visual QA 154 automates the process of comparing design files with actual generated screens and identifies visual differences between the two. Thus, screens generated by the UI engine 142 may be automatically validated by the visual QA 154 system. In various embodiments, a pixel to pixel comparison is performed using computer vision to identify discrepancies on the static page layout of the screen based on location, color contrast and geometrical diagnosis of elements on the screen. Differences may be logged as bugs by scheduler 120 so they can be reviewed by expert developers.

In an exemplary embodiment, visual QA 154 implements an optical character recognition (OCR) engine to detect and diagnose text position and spacing. Additional routines are then used to remove text elements before applying pixel-based diagnostics. At this latter stage, an approach based on similarity indices for computer vision is employed to check element position, detect missing/spurious objects in the UI and identify incorrect colors. Routines for content masking are also implemented to reduce the number of false positives associated with the presence of dynamic content in the UI such as dynamically changing text and/or images.

The visual QA 154 system may be used for computer vision, detecting discrepancies between developed screens, and designs using structural similarity indices. It may also be used for excluding dynamic content based on masking and removing text based on optical character recognition whereby text is removed before running pixel-based diagnostics to reduce the structural complexity of the input images.

The designer surface 144 connects designers to a project network to view all of their assigned tasks as well as create or submit customer designs. In various embodiments, computer readable specifications include prompts to insert designs. Based on the computer readable specification, the designer surface 144 informs designers of designs that are expected of them and provides for easy submission of designs to the computer readable specification. Submitted designs may be immediately available for further customization by expert developers that are connected to a project network.

Similar to building block components 134, the design library 156 contains design components that may be reused across multiple computer readable specifications. The design components in the design library 156 may be configured to be inserted into computer readable specifications, which allows designers and expert developers to easily edit them as a starting point for new designs. The design library 156 may be linked to the designer surface 144, thus allowing designers to quickly browse pretested designs for user and/or editing.

Tracker 146 is a task management tool for tracking and managing granular tasks performed by experts in a project network. In an example of use, common tasks are injected into tracker 146 at the beginning of a project. In various embodiments, the common tasks are determined based on prior projects, completed, and tracked in the software building system 100.

The run entities 108 contain entities that all users, partners, expert developers, and designers use to interact within a centralized project network. In an exemplary embodiment, the run entities 108 include tool aggregator 160, cloud system 162, user control system 164, cloud wallet 166, and a cloud inventory module 168. The tool aggregator 160 entity brings together all third-party tools and services required by users to build, run and scale their software project. For instance, it may aggregate software services from payment gateways and licenses such as Office 365. User accounts may be automatically provisioned for needed services without the hassle of integrating them one at a time. In an exemplary embodiment, users of the run entities 108 may choose from various services on demand to be integrated into their application. The run entities 108 may also automatically handle invoicing of the services for the user.

The cloud system 162 is a cloud platform that is capable of running any of the services in a software project. The cloud system 162 may connect any of the entities of the software building system 100 such as the code platform 150, developer surface 138, designer surface 144, catalogue 136, entity controller 126, specification builder 110, the interactor 112 system, and the prototype module 114 to users, expert developers, and designers via a cloud network. In one example, cloud system 162 may connect developer experts to an IDE and design software for designers allowing them to work on a software project from any device.

The user control system 164 is a system requiring the user to have input over every feature of a final product in a software product. With the user control system 164, automation is configured to allow the user to edit and modify any features that are attached to a software project regardless as to the coding and design by developer experts and designer. For example, building block components 134 are configured to be malleable such that any customizations by expert developers can be undone without breaking the rest of a project. Thus, dependencies are configured so that no one feature locks out or restricts development of other features.

Cloud wallet 166 is a feature that handles transactions between various individuals and/or groups that work on a software project. For instance, payment for work performed by developer experts or designers from a user is facilitated by cloud wallet 166. A user need only set up a single account in cloud wallet 166 whereby cloud wallet handles payments of all transactions.

A cloud allocation tool 148 may automatically predict cloud costs that would be incurred by a computer readable specification. This is achieved by consuming data from multiple cloud providers and converting it to domain specific language, which allows the cloud allocation tool 148 to predict infrastructure blueprints for customers' computer readable specifications in a cloud agnostic manner. It manages the infrastructure for the entire lifecycle of the computer readable specification (from development to after care) which includes creation of cloud accounts, in predicted cloud providers, along with setting up CI/CD to facilitate automated deployments.

The cloud inventory module 168 handles storage of assets on the run entities 108. For instance, building block components 134 and assets of the design library are stored in the cloud inventory entity. Expert developers and designers that are onboarded by onboarding system 116 may have profiles stored in the cloud inventory module 168. Further, the cloud inventory module 168 may store funds that are managed by the cloud wallet 166. The cloud inventory module 168 may store various software packages that are used by users, expert developers, and designers to produce a software product.

Referring to FIG. 2, FIG. 2 is a schematic 200 illustrating an embodiment of the management components 104 of the software building system 100. The management components 104 provide for continuous assessment and management of a project through its entities and systems. The central hub of the management components 104 is entity controller 126. In an exemplary embodiment, core functionality of the entity controller 126 system comprises the following: display computer readable specifications configurations, provide statuses of all computer readable specifications, provide toolkits within each computer readable specification, integration of the entity controller 126 with tracker 146 and the onboarding system 116, integration code repository for repository creation, code infrastructure creation, code management, and expert management, customer management, team management, specification and demonstration call booking and management, and meetings management.

In an exemplary embodiment, the computer readable specification configuration status includes customer information, requirements, and selections. The statuses of all computer readable specifications may be displayed on the entity controller 126, which provides a concise perspective of the status of a software project. Toolkits provided in each computer readable specification allow expert developers and designers to chat, email, host meetings, and implement 3rd party integrations with users. Entity controller 126 allows a user to track progress through a variety of features including but not limited to tracker 146, the UI engine 142, and the onboarding system 116. For instance, the entity controller 126 may display the status of computer readable specifications as displayed in tracker 146. Further, the entity controller 126 may display a list of experts available through the onboarding system 116 at a given time as well as ranking experts for various jobs.

The entity controller 126 may also be configured to create code repositories. For example, the entity controller 126 may be configured to automatically create an infrastructure for code and to create a separate code repository for each branch of the infrastructure. Commits to the repository may also be managed by the entity controller 126.

Entity controller 126 may be integrated into scheduler 120 to determine a timeline for jobs to be completed by developer experts and designers. The BRAT 122 system may be leveraged to score and rank experts for jobs in scheduler 120. A user may interact with the various entity controller 126 features through the analytics component 124 dashboard. Alternatively, a user may interact with the entity controller 126 features via the interactive conversation in the interactor 112 system.

Entity controller 126 may facilitate user management such as scheduling meetings with expert developers and designers, documenting new software such as generating an API, and managing dependencies in a software project. Meetings may be scheduled with individual expert developers, designers, and with whole teams or portions of teams.

Machine learning algorithms may be implemented to automate resource allocation in the entity controller 126. In an exemplary embodiment, assignment of resources to groups may be determined by constrained optimization by minimizing total project cost. In various embodiments a health state of a project may be determined via probabilistic Bayesian reasoning whereby a causal impact of different factors on delays using a Bayesian network are estimated.

Referring to FIG. 3, FIG. 3 is a schematic 300 illustrating an embodiment of the assembly line components 106 of the software building system 100. The assembly line components 106 support the various features of the management components 104. For instance, the code platform 150 is configured to facilitate user management of a software project. The code engine 140 allows users to manage the creation of software by standardizing all code with pretested building block components. The building block components contain LSTs that identify the customizable portions of the building block components 134.

The machine readable specifications may be generated from user specifications. Like the building block components, the computer readable specifications are designed to be managed by a user without software management experience. The computer readable specifications specify project goals that may be implemented automatically. For instance, the computer readable specifications may specify one or more goals that require expert developers. The scheduler 120 may hire the expert developers based on the computer readable specifications or with direction from the user. Similarly, one or more designers may be hired based on specifications in a computer readable specification. Users may actively participate in management or take a passive role.

A cloud allocation tool 148 is used to determine costs for each computer readable specification. In an exemplary embodiment, a machine learning algorithm is used to assess computer readable specifications to estimate costs of development and design that is specified in a computer readable specification. Cost data from past projects may be used to train one or more models to predict costs of a project.

The developer surface 138 system provides an easy to set up platform within which expert developers can work on a software project. For instance, a developer in any geography may connect to a project via the cloud system 162 and immediately access tools to generate code. In one example, the expert developer is provided with a preconfigured IDE as they sign into a project from a web browser.

The designer surface 144 provides a centralized platform for designers to view their assignments and submit designs. Design assignments may be specified in computer readable specifications. Thus, designers may be hired and provided with instructions to complete a design by an automated system that reads a computer readable specification and hires out designers based on the specifications in the computer readable specification. Designers may have access to pretested design components from a design library 156. The design components, like building block components, allow the designers to start a design from a standardized design that is already functional.

The UI engine 142 may automatically convert designs into web ready code such as React code that may be viewed by a web browser. To ensure that the conversion process is accurate, the visual QA 154 system may evaluate screens generated by the UI engine 142 by comparing them with the designs that the screens are based on. In an exemplary embodiment, the visual QA 154 system does a pixel to pixel comparison and logs any discrepancies to be evaluated by an expert developer.

Referring to FIG. 4, FIG. 4 is a schematic 400 illustrating an embodiment of the run entities 108 of the software building system. The run entities 108 provides a user with 3$^{rd}$ party tools and services, inventory management, and cloud services in a scalable system that can be automated to manage a software project. In an exemplary embodiment, the run entities 108 is a cloud-based system that provides a user with all tools necessary to run a project in a cloud environment.

For instance, the tool aggregator 160 automatically subscribes with appropriate 3$^{rd}$ party tools and services and makes them available to a user without a time consuming and potentially confusing set up. The cloud system 162 connects a user to any of the features and services of the software project through a remote terminal. Through the cloud system 162, a user may use the user control system 164 to manage all aspects of a software project including conversing with an intelligent AI in the interactor 112 system, providing user specifications that are converted into computer readable specifications, providing user designs, viewing code, editing code, editing designs, interacting with expert developers and designers, interacting with partners, managing costs, and paying contractors.

A user may handle all costs and payments of a software project through cloud wallet 166. Payments to contractors such as expert developers and designers may be handled through one or more accounts in cloud wallet 166. The automated systems that assess completion of projects such as tracker 146 may automatically determine when jobs are completed and initiate appropriate payment as a result. Thus, accounting through cloud wallet 166 may be at least partially automated. In an exemplary embodiment, payments through cloud wallet 166 are completed by a machine learning AI that assesses job completion and total payment for contractors and/or employees in a software project.

Cloud inventory module 168 automatically manages inventory and purchases without human involvement. For example, cloud inventory module 168 manages storage of data in a repository or data warehouse. In an exemplary embodiment, it uses a modified version of the knapsack algorithm to recommend commitments to data that it stores in the data warehouse. Cloud inventory module 168 further automates and manages cloud reservations such as the tools providing in the tool aggregator 160.

Referring to FIG. 5, FIG. 5 is a schematic illustrating a computing system 500 that may be used to implement various features of embodiments described in the disclosed subject matter. The terms components, entities, modules, surface, and platform, when used herein, may refer to one of the many embodiments of a computing system 500. The computing system 500 may be a single computer, a co-located computing system, a cloud-based computing system, or the like. The computing system 500 may be used to carry out the functions of one or more of the features, entities, and/or components of a software project.

The exemplary embodiment of the computing system 500 shown in FIG. 5 includes a bus 505 that connects the various components of the computing system 500, one or more processors 510 connected to a memory 515, and at least one storage 520. The processor 510 is an electronic circuit that executes instructions that are passed to it from the memory 515. Executed instructions are passed back from the processor 510 to the memory 515. The interaction between the processor 510 and memory 515 allow the computing system 500 to perform computations, calculations, and various computing to run software applications.

Examples of the processor 510 include central processing units (CPUs), graphics processing units (GPUs), field programmable gate arrays (FPGAs), complex programmable logic devices (CPLDs), and application specific integrated circuits (ASICs). The memory 515 stores instructions that are to be passed to the processor 510 and receives executed instructions from the processor 510. The memory 515 also passes and receives instructions from all other components of the computing system 500 through the bus 505. For example, a computer monitor may receive images from the memory 515 for display. Examples of memory include random access memory (RAM) and read only memory (ROM). RAM has high speed memory retrieval and does not hold data after power is turned off. ROM is typically slower than RAM and does not lose data when power is turned off.

The storage 520 is intended for long term data storage. Data in the software project such as computer readable specifications, code, designs, and the like may be saved in a storage 520. The storage 520 may be stored at any location including in the cloud. Various types of storage include spinning magnetic drives and solid-state storage drives.

The computing system 500 may connect to other computing systems in the performance of a software project. For instance, the computing system 500 may send and receive data from 3rd party services such as Office 365 and Adobe. Similarly, users may access the computing system 500 via a cloud gateway 530. For instance, a user on a separate computing system may connect to the computing system 500 to access data, interact with the run entities 108, and even use 3rd party services 525 via the cloud gateway.

Figure 6:
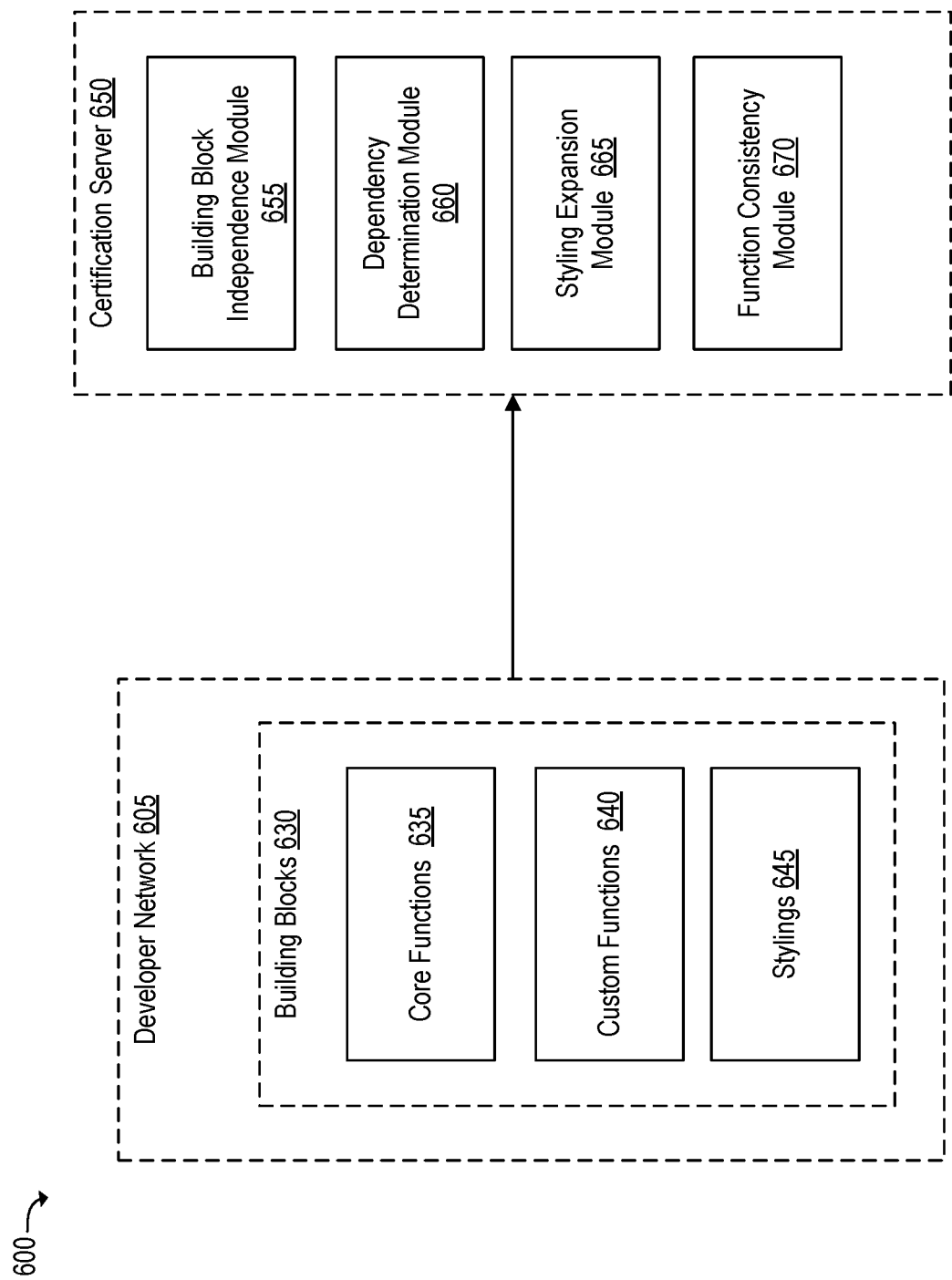
FIG. 6 is a schematic for an embodiment in the disclosed subject matter of a system and method for certification.

Referring to FIG. 6, FIG. 6 is a schematic 600 for an embodiment in the disclosed subject matter of a system and method for certification. Certification may be used to verify that each building block component provided by a library or platform meets a standard that allows it to operate in virtually any software application that may be generated by the disclosed subject matter. For example each building block component should operate independently of other building block components in a software application. To ensure that each building block component meets the standard, building block components that are submitted via developer surface 138 or any other developer network 605, may be checked by a certification server 650.

The developer network 605 may be any system that comprises one or more developers and is used to submit building block components to the certification server 650. For example, the developer service 138 may receive building block components that are submitted by developers and forward them to a certification server 650. In various embodiments, the developer network 605 is a separate computing system, comprising one or more developers, that submits building block components to the certification server 650.

The developer network 605 may include a multitude of building block components 630, which are submitted by the developer network 605 to the certification server. The certification server 650 may be used to ensure that each building block component 630 includes one or more core functions 635 for the building block component. For example, a core function in each building block component 630 may be one or more functions that allow each building block component to send and receive messages in the run network. Core functions 635 may facilitate interaction of each building block component with one or more adapters which allow the building block to transmit messages to and from the run engine.

In addition to the core functions 635, each building block component 630 may include one or more custom functions 640. The custom functions 640 may be any functions, components, modules, files, or the like that a developer includes in a building block 630. In an exemplary embodiment, a building block may include one or more sections that are assigned for custom functions 640. The certification server 650 may check to verify that any custom functions 640 are limited to the section of the building block 630 that is assigned for custom functions 640.

Stylings 645 may be types of data for components, objects, classes, entities, variables, or the like that may be transmitted or received by the building block component 630. For instance, a building block component 630 may be configured to transmit the image data in a PNG format to the run engine. The styling may comprise a data type that is a subset of a superset of data. The certification server 650, in an exemplary embodiment, may modify a building block component 630 to expand the stylings 645 to include additional types of data. In the example given above, where the building block is configured to transmit image data in a PNG format (subset), the certification server 650 may modify one or more functions in the building block component 630 transmit in the additional image formats of JPEG, TIF, BMP, PDF, and raw image format, which together would be the superset of data.

In an exemplary embodiment, the certification server 650 may include a building block independence module 655, a dependency determination module 660, a styling expansion module 665, and a function consistency module 670. The certification server 650 may receive building block components from the developer network 605, verify that the building block meets a minimum standard, and modify the building block based on stylings that the building block is configured to transmit or receive.

The building block independence module 655 may verify that functions in the building block are configured to operate independently of any other building block components. As used herein, the term function may refer to any function, module, component, class, object, interface, method, subroutine, or the like in a programming environment. For example, the building block independence module 655 a run each function in a building block, and the absence of other building block components, to verify that the building block does not cause an error when its functions are executed independent of other building block components.

The dependency determination module 660 may check a building block to determine whether data that it receives is a dependency. For instance, a building block may be configured to receive data and operate on data without being dependent on the data. A building block may be configured to receive data via messages from the run engine. However, the dependency determination module 660 will verify that the building block component is not dependent upon any functions of other building block components when the building block receives data. The term data, as used herein, may refer to any quantity of ordered electrical signals that are received by the building block. Data may refer to any variable, pointer, file, code, key, or the like that is received by a building block. In an exemplary embodiment, the dependency determination module 660 may check to verify that the building block component does not include any calls to functions of other building block components.

The styling expansion module 655 in the certification server 650 may check each building block component for stylings that the building block component sends or receives. The term styling, as used herein, they refer a datatype that belongs to a set of data types. For example, a building block may be configured to transmit text data to a specific social media site. The specific social media site is a styling that can be expanded to a set of many social media sites. For instance, a building block component that is configured to receive messages from LinkedIn may be modified by the styling expansion module 655 to receive messages from other social media sites such as Facebook, Twitter, and Twitch.

The function consistency module 670 verifies that custom functions 640 in a building block perform consistently. For example, a function in a building block that accepts input for a login may be tested by the function consistency module to verify that various types of logins comprising different inputs yield consistent results.

Figure 7:
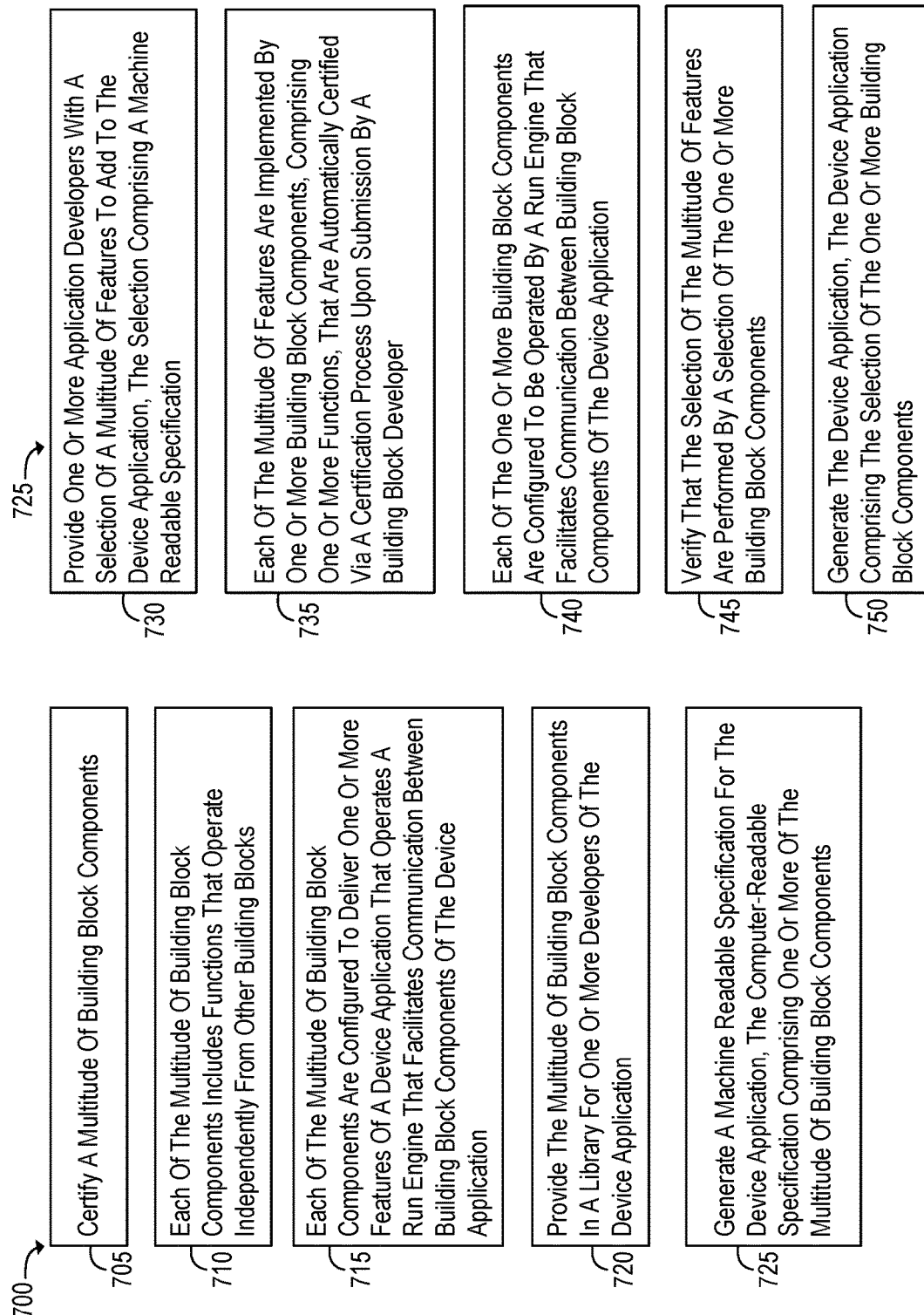
FIG. 7A is a flow diagram for an embodiment of the disclosed subject matter for a process of certifying a building block.
FIG. 7B is another flow diagram for an embodiment of the disclosed subject matter for a process of certifying a building block.

Referring to FIG. 7A, FIG. 7A is a flow diagram 700 for embodiment in the disclosed subject matter for a process of certifying a building block component. The process of the flow diagram 700 may be used by a certification server 650 to verify that all building block components and a library conform to a minimum standard. At step 705, the process may certify a multitude of building block components 630. The certification may be performed by certification server 650 or other computing system. The certification may confirm that each building block component forms to one or more standards set by the process.

At step 710, the process may certify that each of the multitude of building block components includes functions that operate independently from other building block components. For example, the certification server 650 may inspect each building block to verify that the building block does not include calls to functions and other building block components. The certification server 650 may further inspect the building block to verify that it does not include classes that are defined in other building block components. However, building block components may be configured to receive data from outside the building block as long as the building block component operates on the data independently of other building block components.

At step 715, the process may certify that each of the multitude of building block components are configured to deliver one or more features of a device application that operates a run engine that facilitates communication between building block components of the device application. For instance, the certification server 650 may verify that each building block component is configured to operate with one or more adapters that facilitate the sending of messages via the run engine. For example, the certification server 650 may verify that the building block component includes one or more adapters for each output that the building block component produces. In another example, the certification server 650 may verify that the building block component includes one or more adapters for each input data that the building block component is configured to receive.

At step 720, the process may provide the multitude of building block components in the library for one or more developers of the device application. Once the certification server 650 confirms that the building block component meets a minimum standard, the building block component may be uploaded to a library where it is accessible to one or more developers. The more and more developers may then use the building block component to build a device application. In various embodiments, the library may be restricted to one developer or a set of developers for a single project. In various embodiments, the library may be accessible to a large number of developers from various projects in various companies. For example, the library may be an open library accessible to any developer. On the other hand, the library may be private with limited access one or a handful of developers.

At step 725, process may generate a machine readable specification for the device application, the machine readable specification comprising one or more of the multitude of building block components. In an exemplary embodiment, specification builder 110 may generate a machine readable specification based on one or more features provided to the specification builder 110 by user. Specification builder 110 may implement the one or more features by selecting the building block components from the library.

Accordingly, specification builder 110 generates the machine readable specification to incorporate building block components that are certified to operate together in any combination of building block components. Thus, the specification builder 110 does not need to be configured to avoid various combinations of building block components. Likewise, specification builder 110 does not need to be configured to always include various combinations of building block components.

Referring to FIG. 7B, FIG. 7B is another flow diagram for embodiment in the disclosed subject matter for a process of certifying a building block. At step 730, the process may provide one or more application developers with a selection of a multitude of features to add to the device application, the selection comprising a machine readable specification. The machine readable specification may specify the selection of the multitude of features in a way that allows one or more computer systems to verify or confirm components that implement each of the features. For example, the machine-readable specification may specify a feature that a computer system can confirm is performed by one or more building block components.

At step 735, the process may certify that each of the multitude of features are implemented by one or more building block components, comprising one or more functions, that are automatically certified via a certification process upon submission by a building block component developer. The certification process may be automatically performed by computer system such as the certification server 650. Thus, the certification process is fast and requires minimal human intervention.

At step 740, the process may certify that each of the one or more building block components are configured to be operated by a run engine that facilitates communication between building block components of the device application. In an exemplary embodiment, the certification server may inspect each building block component to verify that each building block component includes a functionality to operate within the run engine. An example of the functionality may be that each building block component includes one or more adapters that convert messages to and from the building block component.

At step 745, the process may verify that the selection of the multitude of features are performed by selection of the one or more building block components. For instance, a computing system may inspect one or more building block components submitted by the developer for a software application to verify that the one or more building block components perform the selection of the multitude of features in the machine-readable specification. The computing system may use the machine-readable specification to verify that the features work.

At step 750, the process may generate the device application, the device application includes the selection of the one or more building block components. The process includes certifying that building block components meet a minmum standard. The process further includes certifying that the building block components implement the one or more features.

Figure 8:
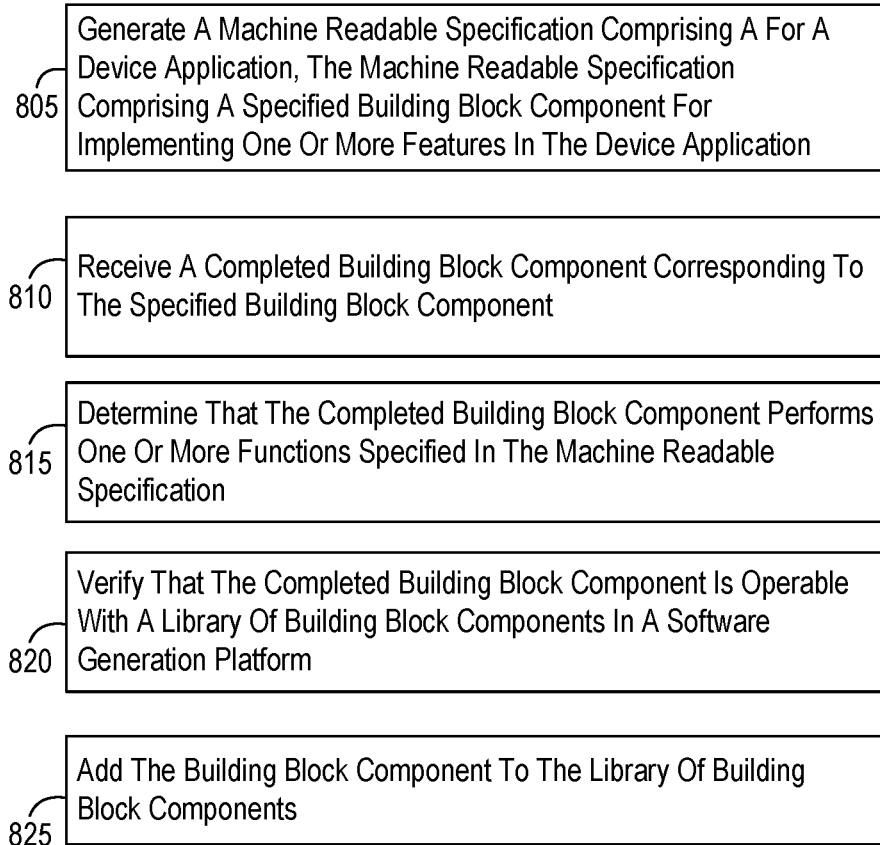
FIG. 8 is yet another flow diagram for an embodiment of the disclosed subject matter for a process of certifying a building block.

Referring to FIG. 8, FIG. 8 is yet another flow diagram 800 for an embodiment in the disclosed subject matter for a process of certifying a building block component. At step 805, the process may generate a machine-readable specification for a device application, the machine-readable specification comprising a specified building block component for implementing one or more features in the device application. The machine-readable specification may direct developers include one or more building block components in a device application so that the one or more building block components may implement the one or more features in the device application. In various embodiments the machine readable specification directs a computing system to automatically include the one or more building block components in a device application.

At step 810, the process may receive a completed building block component corresponding to the specified building block component. In an exemplary embodiment, the complete building block component is submitted by one or more developers after receiving the machine-readable specification. In various embodiments the completed building block component is automatically submitted by a computing system.

At step 815, the process may determine that the completed building block component performs one or more functions specified in the machine-readable specification. In an exemplary embodiment, a computing system may inspect the completed building block component to verify that it performs the features specified in the machine-readable specification. In one example, the machine-readable specification may specify one or more functions that are configured to implement the one or more features. Accordingly, the computer system may verify that the completed building block component performs one or more functions.

At step 820, the process may verify that the completed building block is operable with a library of building block components and a software generation platform. In an exemplary embodiment, the certification server 650 may inspect the completed building block component to verify that functions in the completed building block are not dependent on functions and any other building block component. The certification server 650 may further verify that the building block component is configured to operate within a run engine by sending and receiving messages via an adapter. At step 825, once the certification is complete, the process may add the building block component to the library.

Figure 9:
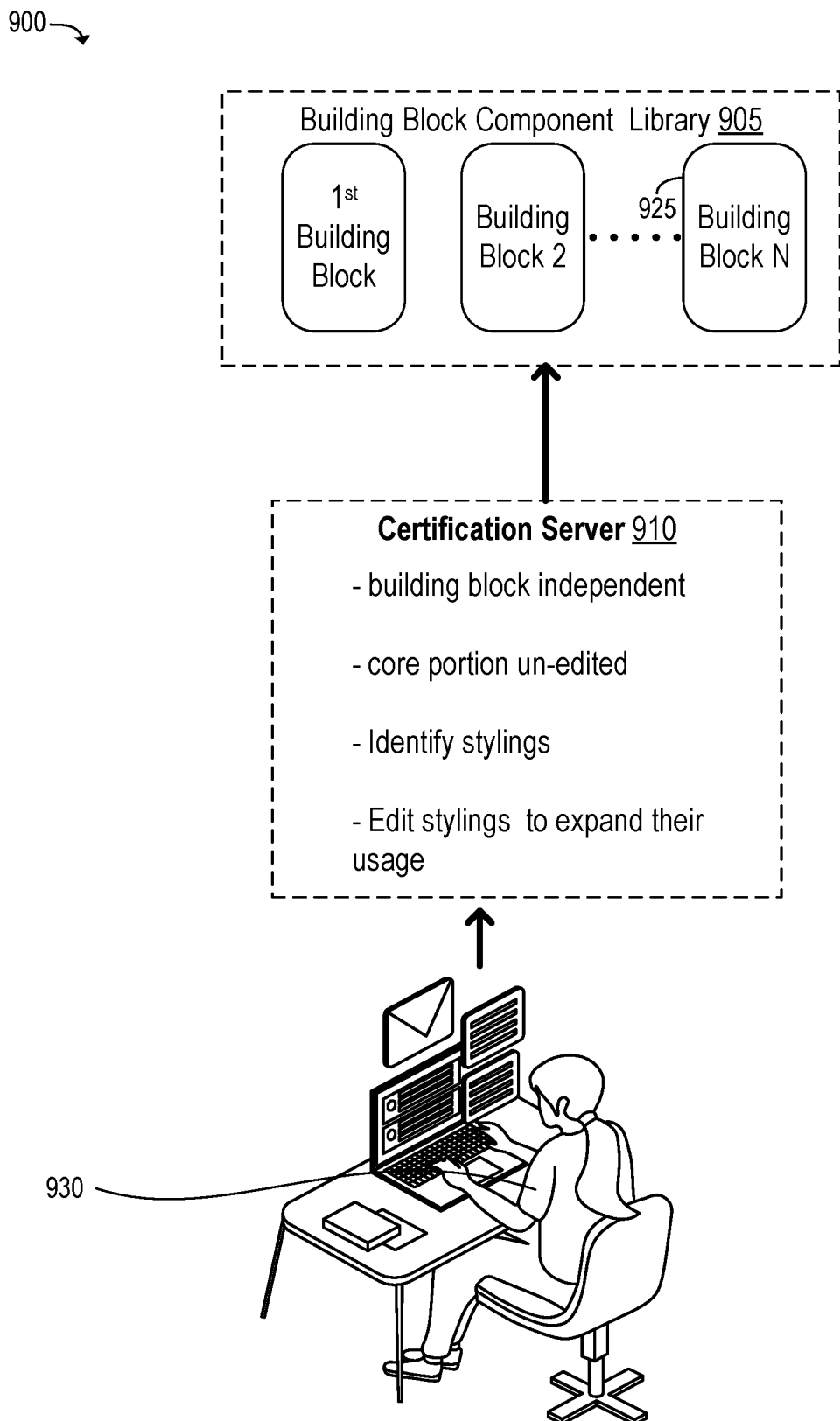
FIG. 9 is an illustration of the process for certifying a building block to generate a software application.

Referring to FIG. 9, FIG. 9 is an illustration 900 of the process for certifying a building block component to generate a software application. The illustration 900 shows how device applications may be constructed and generated based on building block component development by developers who work independently of one another. Since building block components are configured to operate by themselves, various building block components for the same device application may be developed independently without regard for how they would ultimately work in the device application. Instead of development for multiple building block components being strictly managed, each individual building block is certified to meet a minimum standard that allows it to be used to implement features for any device application.

As shown in the illustration 900, a single developer 930 may submit a completed building block component to a certification server 910 to verify that the building block component conforms to minimum standards. In the exemplary embodiment shown in FIG. 9, the certification server verifies that the building block component works independently of other building block components. The certification server verifies that the building block component's core portion is unedited and that custom functions are limited to a portion of the building block component. The certification server further identifies stylings in the building block component and edits the stylings to expand their usage. For example, the certification server 910 may edit a styling for a media object to include additional datatypes of that media object.

After certification by the certification server 910, the building block component may be appended to a building block component library 905. Accordingly, the building block component 925 may be available for one or more developers to add to a device application. In various embodiments, the building block component library 905 may be configured to be available to a limited number of developers.

Many variations may be made to the embodiments of the software project described herein. All variations, including combinations of variations, are intended to be included within the scope of this disclosure. The description of the embodiments herein can be practiced in many ways. Any terminology used herein should not be construed as restricting the features or aspects of the disclosed subject matter. The scope should instead be construed in accordance with the appended claims.

The invention claimed is:

1. A method for providing features for a device application, the method comprising:
   providing one or more application developers with a selection of a multitude of features to add to the device application, the selection comprising a computer readable specification;
   each of the multitude of features are implemented by one or more building block components, comprising one or more functions, that are automatically certified via a certification process upon submission by a building block developer; and
   each of the one or more building block components are configured to be operated by a run engine that facilitates communication between building block components of the device application;
   verifying that the selection of the multitude of features are performed by a selection of the one or more building block components; and
   generating the device application, the device application comprising the selection of the one or more building block components.

2. The method of claim 1, wherein the one or more functions of each building block component are configured to operate independently of the one or more functions of each other building block component of the one or more building block components.

3. The method of claim 2, wherein the certification process comprises verifying that the one or more functions of each building block component are configured to operate independently of functions of other building block components.

4. The method of claim 3, wherein the certification process further comprises:
   determining one or more data types that each building block component is configured to send or receive; and
   editing the building block component to expand the one or more data types that the building block component is configured to send or receive.

5. The method of claim 4, wherein the editing comprises determining that the one or more data types are a subset of a superset of data; and
   further comprising modifying the data types to comprise data in the superset of data that are not within the subset.

6. The method of claim 5, wherein at least one of the one or more date types is media that can be played on a computer device.

7. The method of claim 5, wherein at least one of the one or more date types is a social media network.

8. The method of claim 5, further comprising adding the building block component to the selection subsequent to modifying the subset.

9. A computer system to provide features for a device application, the computer system comprising:
   a processor coupled to a memory, the processor configured to execute a software to perform:

provide one or more application developers with a selection of a multitude of features to add to the device application, the selection comprising a computer readable specification;

each of the multitude of features are implemented by one or more building block components, comprising one or more functions, that are automatically certified via a certification process upon submission by a building block developer; and each of the one or more building block components are configured to be operated by a run engine that facilitates communication between building block components of the device application;

verify that the selection of the multitude of features are performed by a selection of the one or more building block components; and generate the device application, the device application comprising the selection of the one or more building block components.

10. The computer system of claim 9, wherein the one or more functions of each building block component are configured to operate independently of the one or more functions of each other building block component of the one or more building block components.

11. The computer system of claim 10, wherein the certification process comprises verifying that the one or more functions of each building block component are configured to operate independently of functions of other building block components.

12. The computer system of claim 11, wherein the certification process further comprises:
determining one or more data types that each building block component is configured to send or receive; and
editing the building block component to expand at least one of the one or more data types that the building block component is configured to send or receive.

13. The computer system of claim 12, wherein edit comprises:
determine that the at least one of the one or more the data types are a subset of a superset of data; and
modify the one or more data types to comprise data in the superset of data that are not within the subset.

14. The computer system of claim 13, wherein the at least one of the one or more the data types is media that can be played on a computer device.

15. The computer system of claim 13, wherein the at least one of the one or more the data types is a social media network.

16. The computer system of claim 13, wherein the processor is further configured to add the building block component to the selection subsequent to modifying the subset.

17. A computer readable storage medium having data stored therein representing software executable by a computer, the software comprising instructions that, when executed, cause the computer readable storage medium to perform:

providing one or more application developers with a selection of a multitude of features to add to a device application, the selection comprising a computer readable specification;

each of the multitude of features are implemented by one or more building block components, comprising one or more functions, that are automatically certified via a certification process upon submission by a building block developer; and each of the one or more building block components are configured to be operated by a run engine that facilitates communication between building block components of the device application;

verifying that the selection of the multitude of features are performed by a selection of the one or more building block components; and generating the device application, the device application comprising the selection of the one or more building block components.

18. The computer readable storage medium of claim 17, wherein the one or more functions of each building block component are configured to operate independently of the one or more functions of each other building block component of the one or more building block components.

19. The computer readable storage medium of claim 18, wherein the certification process comprises verifying that the one or more functions of each building block component are configured to operate independently of functions of other building block components.

20. The computer readable storage medium of claim 19, wherein the certification process further comprises:
determining one or more data types that each building block component is configured to send or receive; and
editing the building block component to expand at least one of the one or more data types that the building block component is configured to send or receive.

* * * * *